United States Patent
Chae et al.

(10) Patent No.: US 9,821,672 B2
(45) Date of Patent: Nov. 21, 2017

(54) ELECTRONIC DEVICE, ELECTRIC VEHICLE, AND WIRELESS ELECTRIC POWER TRANSMISSION DEVICE

(71) Applicant: LG ELECTRONICS INC., Seoul (KR)

(72) Inventors: Beomseok Chae, Seoul (KR); Jeongeon Park, Seoul (KR); Kihyun Jung, Seoul (KR); Jeongkyo Seo, Seoul (KR); Byungsang Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 254 days.

(21) Appl. No.: 14/770,041

(22) PCT Filed: Feb. 28, 2014

(86) PCT No.: PCT/KR2014/001681
§ 371 (c)(1),
(2) Date: Aug. 24, 2015

(87) PCT Pub. No.: WO2014/137109
PCT Pub. Date: Sep. 12, 2014

(65) Prior Publication Data
US 2016/0001663 A1 Jan. 7, 2016

(30) Foreign Application Priority Data
Mar. 4, 2013 (KR) .................. 10-2013-0022926

(51) Int. Cl.
*B60L 1/00* (2006.01)
*B60L 11/18* (2006.01)
(Continued)

(52) U.S. Cl.
CPC .............. *B60L 11/182* (2013.01); *B60L 1/006* (2013.01); *H01F 27/24* (2013.01); *H01F 38/14* (2013.01);
(Continued)

(58) Field of Classification Search
CPC ......... B60L 11/182; B60L 1/006; H02J 7/025; H02J 5/005; Y02T 10/7005; Y02T 10/7072
(Continued)

(56) References Cited

U.S. PATENT DOCUMENTS

2003/0218066 A1* 11/2003 Fernandes .............. G06K 7/084
235/449
2011/0285210 A1* 11/2011 Lemmens ............... H02J 5/005
307/104

FOREIGN PATENT DOCUMENTS

JP        6-105486 A    4/1994
JP        9-330838 A    12/1997
(Continued)

*Primary Examiner* — Thomas Skibinski
(74) *Attorney, Agent, or Firm* — Birch, Stewart, Kolasch & Birch, LLP

(57) ABSTRACT

An electronic device according to an embodiment of the present invention is configured to wirelessly receive electric power from a wireless electric power transfer device. A power reception unit of the electronic device comprises: a core having a predetermined length and having magnetic flux concentration portions formed at lengthwise side portions thereof; and a coil wound along an outer periphery of the core to form magnetic flux density in the magnetic flux concentration portions, the magnetic flux density having a magnitude equal to or larger than a predetermined value.

16 Claims, 24 Drawing Sheets

(51) Int. Cl.
*H01F 38/14* (2006.01)
*H01F 27/24* (2006.01)
*H02J 5/00* (2016.01)
*H02J 50/12* (2016.01)
*H02J 17/00* (2006.01)
*H02J 7/02* (2016.01)

(52) U.S. Cl.
CPC .............. *H02J 5/005* (2013.01); *H02J 50/12* (2016.02); *H02J 7/025* (2013.01); *H02J 17/00* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ..... 307/104; 336/233, 221, 15, 82, 115–129
See application file for complete search history.

(56) References Cited

FOREIGN PATENT DOCUMENTS

| | | |
|---|---|---|
| JP | 10-94180 A | 4/1998 |
| JP | 2008-141857 A | 6/2008 |
| KR | 10-2011-0041173 A | 4/2011 |

* cited by examiner

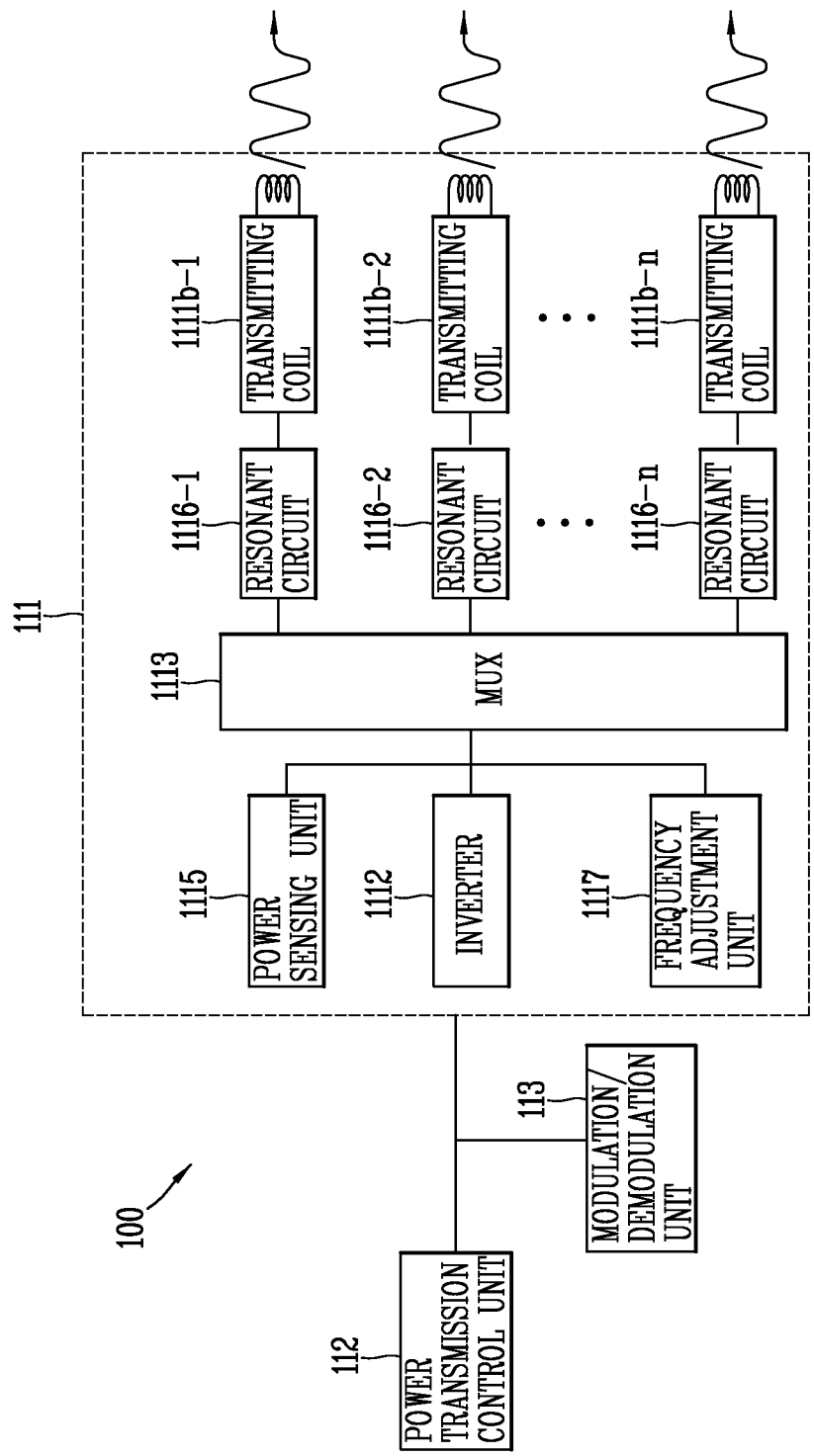

ELECTRONIC DEVICE, ELECTRIC VEHICLE, AND WIRELESS ELECTRIC POWER TRANSMISSION DEVICE

TECHNICAL FIELD

The present disclosure relates to an electronic device, an electric vehicle, and wireless power transmission (or wireless power transfer) of a wireless power transfer device (a wireless power transmission device or apparatus, a wireless power transmitter, etc.).

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

The Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010. The standard document of the WPC describes a method of transferring power from one wireless power transmitter to one wireless power receiver according to a magnetic inductive scheme.

SUMMARY OF THE INVENTION

Therefore, an aspect of the detailed description is to provide an electronic device having a coil and a core with different structures from the conventional structures, an electric vehicle and a wireless power transmitter (or a wireless power transfer device or apparatus).

Another aspect of the detailed description is to provide an electronic device capable of exhibiting more improved wireless charging efficiency, an electric vehicle and a wireless power transmitter.

To achieve these and other advantages and in accordance with the purpose of the present invention, as embodied and broadly described herein, there is provided an electronic device configured to wirelessly receive electric power from a wireless power transfer device. A power reception unit of the electronic device may include a core having a predetermined length and having magnetic flux concentration portions formed at lengthwise side portions thereof, and a coil wound along an outer periphery of the core to form magnetic flux density in the magnetic flux concentration portions, the magnetic flux density having a magnitude equal to or larger than a predetermined value.

In accordance with one embodiment of the present invention, the core may include a first magnetic flux concentration portion formed at a first side portion thereof, and a second magnetic flux concentration portion formed at a second side portion facing the first side portion. The coil may be uniformly wound along the core between the first magnetic flux concentration portion and the second magnetic flux concentration portion.

In accordance with one embodiment of the present invention, the core may contain ferrite.

In accordance with one embodiment of the present invention, points of the core with the maximum magnetic flux density may be lengthwise side ends of the core.

In accordance with one embodiment of the present invention, each of the magnetic flux concentration portions comprises at least one protrusion formed on one surface thereof facing the wireless power transfer device.

In accordance with one embodiment of the present invention, the side end may be rounded.

In accordance with one embodiment of the present invention, the one surface of the magnetic flux concentration portion, facing the wireless power transfer device, may protrude toward the wireless power transfer device.

In accordance with one embodiment of the present invention, a power transmission unit of the wireless power transfer device may include a core and a coil which are symmetric to the core and the coil of the power reception unit.

To achieve these and other advantages and in accordance with the purpose of the present invention, as embodied and broadly described herein, there is provided an electric vehicle configured to wirelessly receive electric power from a wireless power transfer device. A power reception unit of the electric vehicle may include a core having a predetermined length and having magnetic flux concentration portions formed at lengthwise side portions thereof, and a coil wound along an outer periphery of the core to form magnetic flux density in the magnetic flux concentration portions, the magnetic flux density having a magnitude equal to or larger than a predetermined value.

To achieve these and other advantages and in accordance with the purpose of the present invention, as embodied and broadly described herein, there is provided wireless power transfer device configured to wirelessly transmit power to an electric vehicle or an electronic device. A power transmission unit of the wireless power transfer device may include a core having a predetermined length and having magnetic flux concentration portions formed at lengthwise side portions thereof, and a coil wound along an outer periphery of the core to form magnetic flux density in the magnetic flux concentration portions, the magnetic flux density having a magnitude equal to or larger than a predetermined value.

In accordance with one embodiment of the present invention, the core may include a first magnetic flux concentration portion formed at a first side portion thereof, and a second magnetic flux concentration portion formed at a second side portion facing the first side portion, and the coil may be uniformly wound along the core between the first magnetic flux concentration portion and the second magnetic flux concentration portion.

In accordance with one embodiment of the present invention, the core may contain ferrite.

In accordance with one embodiment of the present invention, points of the core with the maximum magnetic flux density may be lengthwise side ends of the core.

In accordance with one embodiment of the present invention, each of the magnetic flux concentration portions may include at least one protrusion formed on one surface thereof facing the electric vehicle or the electronic device.

In accordance with one embodiment of the present invention, the side end may be rounded.

In accordance with one embodiment of the present invention, the one surface of the magnetic flux concentration portion, facing the electric vehicle or the electronic device, may protrude toward the electric vehicle or the electronic device.

In accordance with one embodiment of the present invention, a power reception unit of the electric vehicle or the electronic device may include a core and a coil which are symmetric to the core and the coil of the power transmission unit.

In accordance with one embodiment of the present invention, the wireless power transfer device may further include stoppers configured to restrict a movement of the electric vehicle or the electronic device when the power reception unit is arranged to face the power transmission unit.

In accordance with the detailed description, an electronic device, an electric vehicle and a wireless power transfer device in accordance with at least one embodiment of the present invention can achieve predetermined wireless charging efficiency or more by enabling sufficient magnetic induction even when first and second coils are misaligned with each other.

Also, a coupling coefficient between cores can increase which may result in enhancement of wireless charging efficiency.

BRIEF DESCRIPTION OF THE DRAWINGS

FIG. 8 is a block diagram illustrating a wireless power transmitter configured to have one or more transmitting coils receiving power according to a resonance coupling method that can be employed in the embodiments disclosed herein.

DETAILED DESCRIPTION OF THE EMBODIMENTS

Figure 1:
FIG. 1 is an exemplary view conceptually illustrating a wireless power transmitter and an electronic device according to the embodiments of the present invention.

The technologies disclosed herein may be applicable to wireless power transfer (or wireless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1—Conceptual View of Wireless Power Transmitter and Electronic Device

FIG. 1 is an exemplary view conceptually illustrating a wireless power transmitter and an electronic device according to the embodiments of the present invention.

Referring to FIG. 1, a wireless power transmitter 100 may be a power transfer apparatus configured to transfer power required for an electronic device 200 in a wireless manner.

Furthermore, the wireless power transmitter 100 may be a wireless charging apparatus configured to charge a battery of the wireless electronic device 200 by transferring power in a wireless manner. An embodiment of the wireless power transmitter 100 will be explained later with reference to FIG. 9.

Additionally, the wireless power transmitter 100 may be implemented with various forms of apparatuses transferring power to the electronic device 200 requiring power in a contactless state.

The electronic device 200 is a device that is operable by receiving power from the wireless power transmitter 100 in a wireless manner. Furthermore, the electronic device 200 may charge a battery using the received wireless power.

On the other hand, the electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The electronic device 200, as described later, may be a mobile communication terminal (for example, a portable phone, a cellular phone, a tablet and the like) or a multimedia device. An embodiment in which the electronic device 200 is implemented as a mobile terminal will be explained later with reference to FIG. 10.

On the other hand, the wireless power transmitter 100 may transfer power in a wireless manner without mutual contact to the electronic device 200 using one or more wireless power transfer methods. In other words, the wireless power transmitter 100 may transfer power using at least one of an inductive coupling method based on electromagnetic induction phenomenon by the wireless power signal and an electromagnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the electronic device 200 generates resonance by a wireless power signal transmitted from the wireless power transmitter 100 to transfer power from the wireless power transmitter 100 to the electronic device 200 by the resonance phenomenon.

Hereinafter, the wireless power transmitter 100 and electronic device 200 according to the embodiments disclosed herein will be described in detail. In assigning reference numerals to the constituent elements in each of the following drawings, the same reference numerals will be used for the same constituent elements even though they are shown in a different drawing.

Figure 2A:
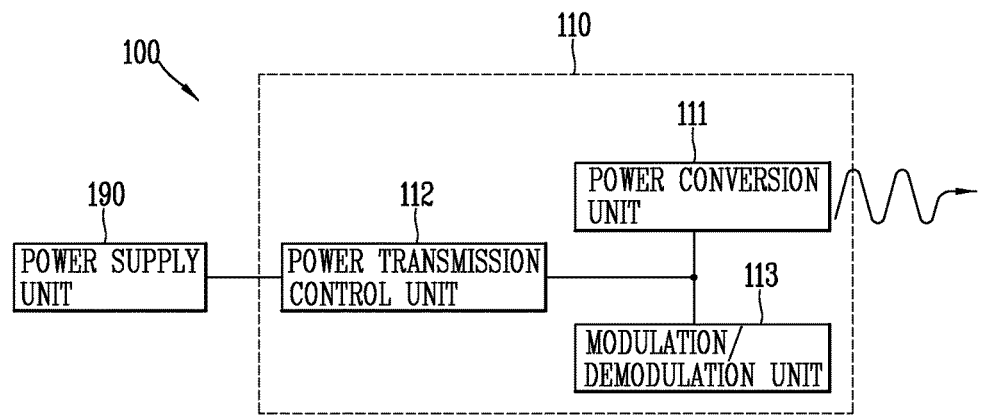
FIG. 2A and FIG. 2B are exemplary block diagrams illustrating the configuration of a wireless power transmitter 100 and an electronic device 200 that can be employed in the embodiments disclosed herein, respectively.
Figure 2B:
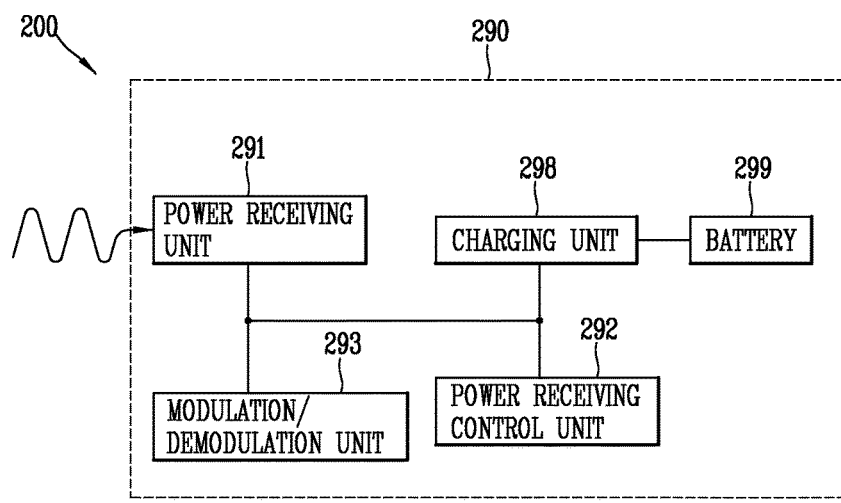

FIG. 2A and FIG. 2B are exemplary block diagrams illustrating the configuration of a wireless power transmitter 100 and an electronic device 200 that can be employed in the embodiments disclosed herein.

FIG. 2A—Wireless Power Transmitter

As illustrated in FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the electronic device 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the electronic device 200. Furthermore, the power conversion unit 111 may include a coil (or antenna) for forming a magnetic field having a specific resonant frequency to generate a resonant frequency in the electronic device 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4A, 4B and 5, and those for the resonance coupling method will be described with reference to FIGS. 7A, 7B and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region which the wireless power signal can be approached may be divided into two types. First, an active area denotes a region through which a wireless power signal transferring power to the electronic device 200 is passed. Next, a semi-active area denotes an interest region in which the wireless power transmitter 100 can detect the existence of the electronic device 200. Here, the power transmission control unit 112 may detect whether the wireless power receiver 200 is placed in the active area or semi-active area or removed from the area. Specifically, the power transmission control unit 112 may detect whether or not the electronic device 200 is placed in the active area or semi-active area using a wireless power signal formed from the power conversion unit 111 or a sensor separately provided therein. For instance, the power transmission control unit 112 may detect the presence of the electronic device 200 by monitoring whether or not the characteristic of power for forming the wireless power signal is changed by the wireless power signal, which is affected by the electronic device 200 existing in the semi-active area. However, the active area and semi-active area may vary according to the wireless power transfer method such as an inductive coupling method, a resonance coupling method, and the like.

The power transmission control unit 112 may perform the process of identifying the electronic device 200 or determine whether to start wireless power transfer according to a result of detecting the existence of the electronic device 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the electronic device 200. In some embodiments, the power transmission control unit 112 may decide the characteristic based on device identification information related to the electronic device 200. In some embodiments, the power transmission control unit 112 may decide the characteristic based on required power information or profile information related to the required power. The power transmission control unit 112 may receive a power control message from the electronic device 200. The power transmission control unit 112 may decide the at least one characteristic of the frequency, the voltage and the current of the power conversion unit 111 on the basis of the received power control message, and also perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the electronic device 200.

Furthermore, as another control operation using the power control message, the wireless power transmitter 100 may perform a typical control operation associated with wireless power transfer based on the power control message. For example, the wireless power transmitter 100 may receive information associated with the electronic device 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may demodulate a wireless power signal that has been modulated by the electronic device 200 and use it to receive the power control message.

In addition, the power transmission control unit 112 may acquire a power control message by receiving user data including the power control message by a communication means (not shown) included in the wireless power transmitter 100.

In accordance with one exemplary embodiment, the wireless power transmitter 100 may supply power to a plurality of electronic devices. Here, collision may occur between wireless power signal which have been modulated by the plurality of electronic devices. Hence, the constituent elements included in the wireless power transmitter 100 may perform various operations to avoid such collision between the modulated wireless power signal.

In one exemplary embodiment, the power conversion unit 111 may convert power supplied from the transmission side power supply unit 190 into a wireless power signal and transfer it to the plurality of electronic devices. For example, the plurality of electronic devices may be two electronic devices, namely, a first electronic device and a second electronic device.

The power conversion unit 111 may generate a wireless power signal for power transmission, and receive a first response signal and a second response signal corresponding to the wireless power signal.

The power transmission control unit 112 may determine whether or not the first and second response signals collide with each other. When the first and second response signals collide with each other according to the determination result, the power transmission control unit 112 may reset the power transmission.

The first and second response signals may be generated by modulating the wireless power signal through the first and second electronic devices.

Through the resetting of the power transmission, the power transmission control unit 112 may control the power conversion unit 111 to sequentially receive the first and second response signals, which are generated to avoid collision with each other.

The sequential reception indicates that the first response signal is received after a first time interval and the second response signal is received after a second time interval within a predetermined response period. The first and second time intervals may be decided based on a value obtained by generating a random number.

The predetermined response period (Tping interval) may be decided to be long enough to include both the first response signal and the second response signal. Also, it may be decided after resetting the power transmission.

In accordance with one exemplary embodiment, occurrence or non-occurrence of the collision may be determined according to whether or not the first and second response signals are decoded using a preset format. The preset format may include a preamble, a header and a message. Whether or not the first and second response signals collide with each other may be determined based on whether or not the first and second response signals are not recoverable due to an error generation in at least one of the preamble, the header and the message caused by the collision.

In accordance with one exemplary embodiment, the power conversion unit 111 may periodically receive a response signal of the first device, which does not collide with a response signal of the second device within a first response period (Tping interval_1). The power transmission control unit may decode the first response signal and the second response signal using a preset format, and determine whether or not the first and second response signals have collided with each other based on whether or not the decoding is performed. Here, the first response signal and the second response signal may be periodically received within a second response period (Tping interval_2). The second response period (Tping interval_2) may be decided long enough to include both the first and second response signals, and be decided after resetting the power transmission.

FIG. 2B—Electronic Device

Referring to FIG. 2B, the electronic device 200 may include a power supply unit 290. The power supply unit 290 supplies power required for the operation of the electronic device 200. The power supply unit 290 may include a power reception unit 291 and a power reception control unit 292.

The power reception unit 291 receives power transferred from the wireless power transmitter 100 in a wireless manner.

The power reception unit 291 may include constituent elements required to receive the wireless power signal according to a wireless power transfer method. Furthermore, the power reception unit 291 may receive power according to at least one wireless power transfer method, and in this case, the power reception unit 291 may include constituent elements required for each method.

First, the power reception unit 291 may include a coil for receiving a wireless power signal transferred in the form of a magnetic field or electromagnetic field having a vibration characteristic.

For instance, as a constituent element according to the inductive coupling method, the power reception unit 291 may include a secondary coil to which a current is induced by a changing magnetic field. In exemplary embodiments, the power reception unit 291, as a constituent element according to the resonance coupling method, may include a coil and a resonant circuit in which resonance phenomenon is generated by a magnetic field having a specific resonant frequency.

In another exemplary embodiments, when the power reception unit 291 receives power according to at least one wireless power transfer method, the power reception unit 291 may be implemented to receive power by using a coil, or implemented to receive power by using a coil formed differently according to each power transfer method.

Among the constituent elements included in the power reception unit 291, those for the inductive coupling method will be described later with reference to FIG. 4A or 4B, and those for the resonance coupling method with reference to FIG. 7A or 7B.

On the other hand, the power reception unit 291 may further include a rectifier and a regulator to convert the wireless power signal into a direct current. Furthermore, the power reception unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through the wireless power signal. In another exemplary embodiment, the power reception control unit 292 may transmit the power control message through a method for transmitting user data.

In order to transmit the foregoing power control message, the electronic device 200 may further include a modulation/demodulation unit 293 electrically connected to the power reception unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power reception unit 291. At this time, the power reception control unit 292 controls the power communications modulation/demodulation unit 293 at the side of the electronic device 200 to modulate the wireless power signal. For instance, the power reception control unit 292 may perform a modulation process such that a power amount received from the wireless power signal is varied by changing a reactance of the power communications modulation/demodulation unit 293 connected to the power reception unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the electronic device 200.

In addition, the power supply unit 290 may further include a charger 298 and a battery 299.

The electronic device 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

In one exemplary embodiment, the plurality of electronic devices may receive power from the wireless power transmitter 100. Here, collision may occur between wireless power signals which have been modulated by the plurality of electronic devices. Hence, the constituent elements included in the wireless power transmitter 100 may perform various operations to avoid such collision between the modulated wireless power signals.

In one exemplary embodiment, the power reception unit 291 may receive the wireless power signal for the power transmission from the wireless power transmitter.

Here, the power reception control unit 292 may control the power reception unit 291 to transmit a third response signal corresponding to the wireless power signal after a time interval set to a first time within the first response period (Tping interval_1).

In one exemplary embodiment, the power reception control unit 292 may determine whether or not the power transmission of the wireless power transmitter 100 has been reset due to collision between the modulated wireless power signal, and set the time interval to a second time when the power transmission has been reset according to the determination result.

In one exemplary embodiment, the power reception control unit 292 may control the power reception unit 291 to transmit a fourth response signal corresponding to the wireless power signal after the time interval set to the second time within the second response period (Tping interval_2). The second time may be decided by a value obtained by generating a random number.

Hereinafter, a wireless power transmitter and an electronic device applicable to the embodiments disclosed herein will be described.

First, a method of allowing the wireless power transmitter to transfer power to the electronic device according to the inductive coupling method will be described with reference to FIGS. 3 through 5.

Figure 3:
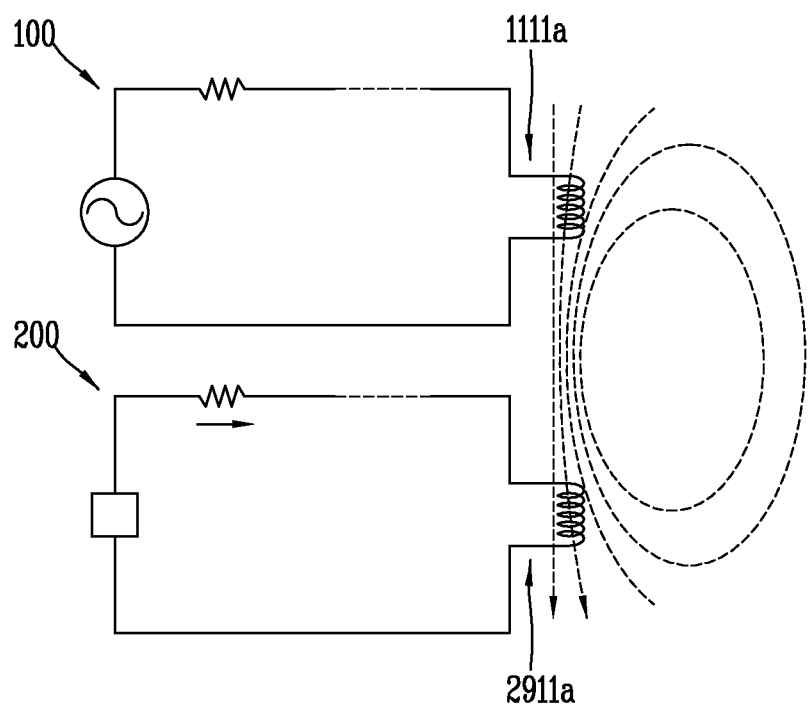
FIG. 3 is a view illustrating a concept in which power is transferred from a wireless power transmitter to an electronic device in a wireless manner according to an inductive coupling method.

FIG. 3—Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 may include a transmitting (Tx) coil 1111a being operated as a primary coil in magnetic induction. Furthermore, the power reception unit 291 of the electronic device 200 may include a receiving (Rx) coil 2911a being operated as a secondary coil in magnetic induction.

First, the wireless power transmitter 100 and electronic device 200 are disposed in such a manner that the transmitting coil 1111a at the side of the wireless power transmitter 100 and the receiving coil at the side of the electronic device 200 are located adjacent to each other. Then, if the power transmission control unit 112 controls a current of the transmitting coil (Tx coil) 1111a to be changed, then the power reception unit 291 controls power to be supplied to the electronic device 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the electronic device 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the electronic device 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device 200 is to be placed at an upper portion of the interface surface. The alignment indicator indicates a location of the electronic device 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the electronic device 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 may be formed to include one or more transmitting coils. The wireless power transmitter 100 may selectively use some of coils suitably arranged with the receiving coil 2911a of the electronic device 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
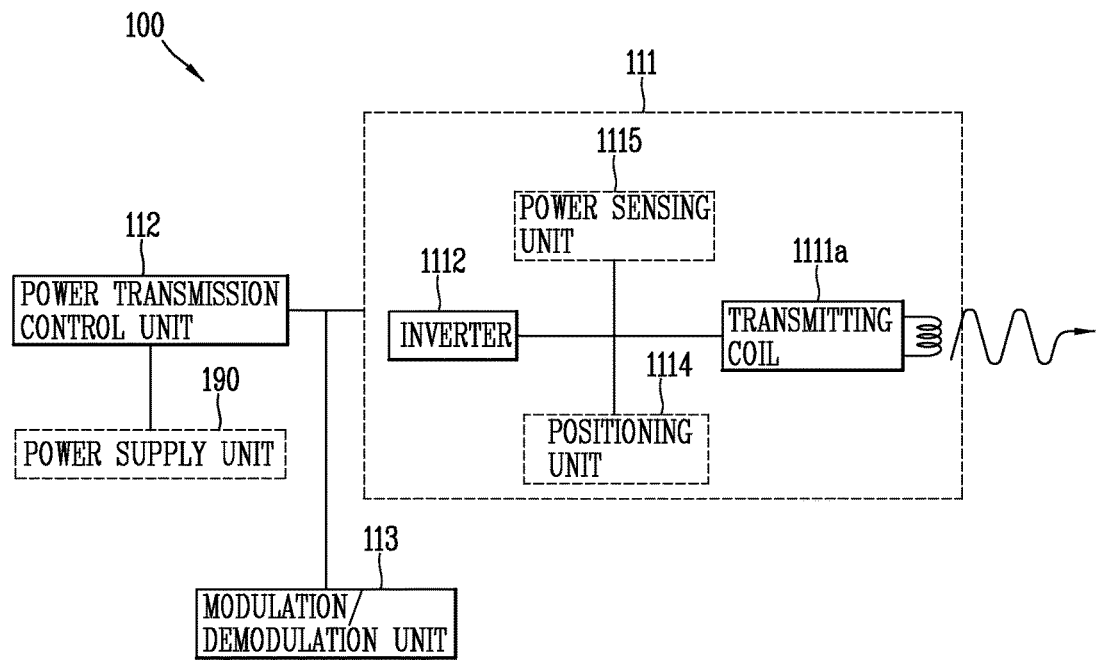
FIG. 4A and FIG. 4B are block diagrams illustrating part of the wireless power transmitter 100 and electronic device 200 in a magnetic induction method that can be employed in the embodiments disclosed herein.
Figure 4B:
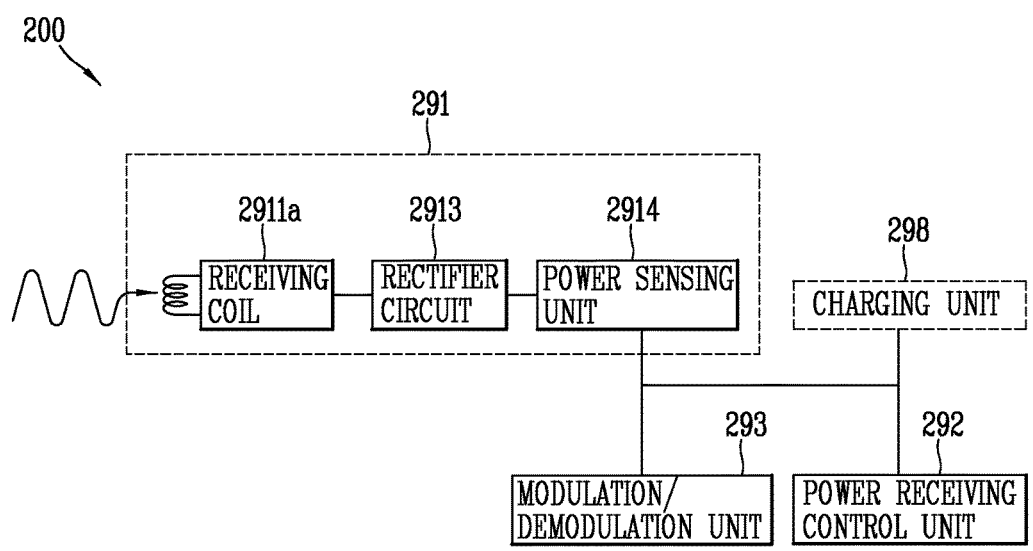

FIGS. 4A and 4B—Wireless Power Transmitter and Electronic Device in Inductive Coupling Method FIGS. 4A and 4B are block diagrams illustrating part of the wireless power transmitter 100 and electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the electronic device 200 including a primary coil and a secondary coil may affect power transfer using the inductive coupling method. In particular, the positioning unit 1114 may be used when the electronic device 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the electronic device 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the electronic device 200, and the power transmission control unit 112 may control the positioning unit 1114 based on the location information of the electronic device 200 received from the location detection sensor.

Furthermore, to this end, the power transmission control unit 112 may receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the electronic device 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator circuit for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power reception unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power reception unit 291.

On the other hand, the power supply unit 290 may further include a power sensing unit 2914. The power sensing unit 2914 at the side of the electronic device 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Figure 5:
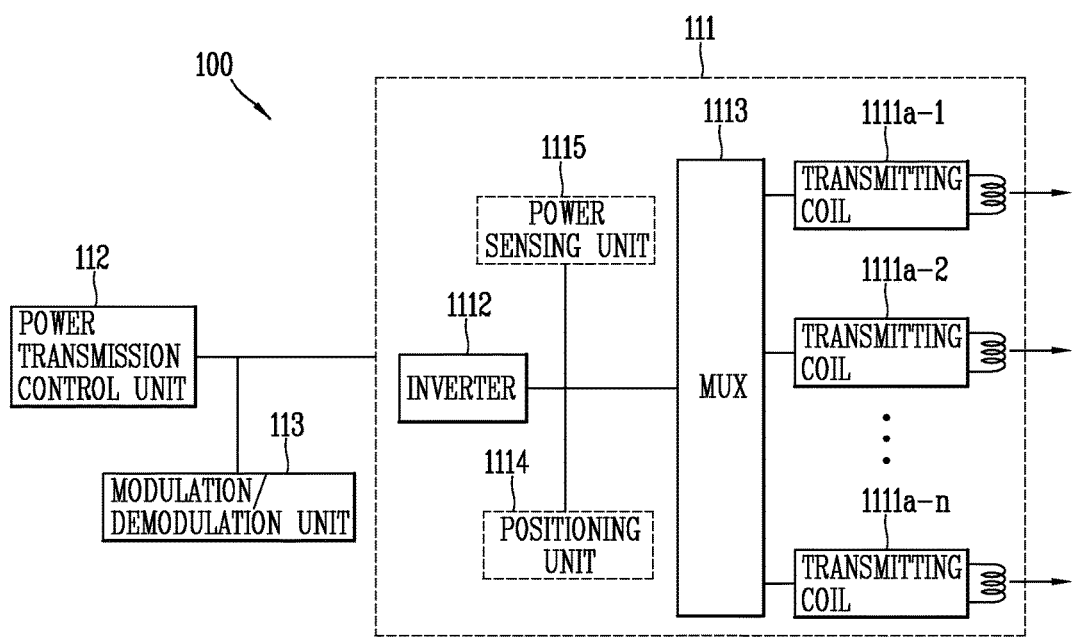
FIG. 5 is a block diagram illustrating a wireless power transmitter configured to have one or more transmitting coils receiving power according to an inductive coupling method that can be employed in the embodiments disclosed herein.

FIG. 5—Wireless Power Transmitter Including One or More Transmitting Coils

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the electronic device 200 placed at an upper portion of the interface surface, the power transmission control unit 112 may take the detected location of the electronic device 200 into consideration to control the multiplexer 1113, thereby allowing coils that can be placed in an inductive coupling relation to the receiving coil 2911a of the electronic device 200 among the one or more transmitting coils 1111a-1 to 1111a-n to be connected to one another.

For this purpose, the power transmission control unit 112 may acquire the location information of the electronic device 200. For example, the power transmission control unit 112 may acquire the location of the electronic device 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the electronic device 200.

On the other hand, the active area as part of the interface surface may denote a portion through which a magnetic field with a high efficiency can pass when the wireless power transmitter 100 transfers power to the electronic device 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the electronic device 200, and establish the connection of a primary cell corresponding to the active area to control the multiplexer 1113, thereby allowing the receiving coil 2911a of the electronic device 200 and the coils belonging to the primary cell to be placed in an inductive coupling relation.

In the meantime, upon disposing one or more electronic devices 200 on an interface surface of the wireless power transmitter 100, which includes the one or more transmitting coils 1111a-1 to 1111a-n, the power transmission control unit 112 may control the multiplexer 1113 to allow the coils belonging to the primary cell corresponding to the position of each electronic device to be placed in the inductive coupling relation. Accordingly, the wireless power transmitter 100 may generate the wireless power signal using different coils, thereby transferring it to the one or more electronic devices in a wireless manner.

Also, the power transmission control unit 112 may set power having a different characteristic to be supplied to each of the coils corresponding to the electronic devices. Here, the wireless power transmitter 100 may transfer power by differently setting a power transfer scheme, efficiency, characteristic and the like for each electronic device.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
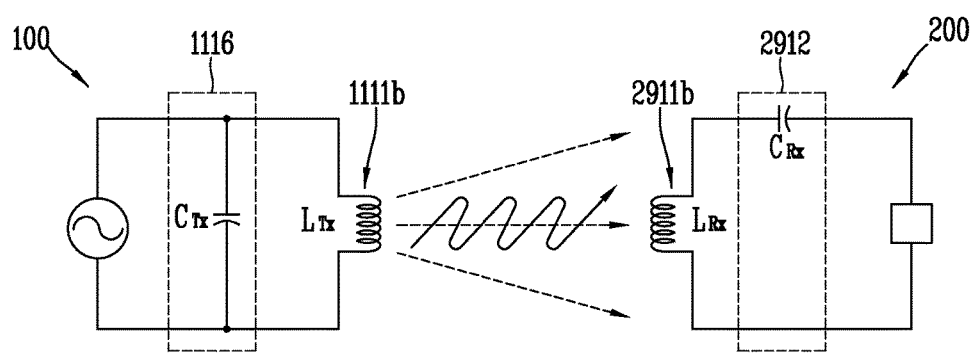
FIG. 6 is a view illustrating a concept in which power is transferred to an electronic device from a wireless power transmitter in a wireless manner according to a resonance coupling method.

FIG. 6—Resonance Coupling Method

FIG. 6 is a view illustrating a concept in which power is transferred to an electronic device from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device 200 by the formed magnetic field, then power is generated by the resonance phenomenon in the electronic device 200.

As aforementioned, if the plurality of vibrating bodies resonate with each other in an electromagnetic manner as aforementioned, extremely high power transmission efficiency may be exhibited due to non affection by adjacent objects except for the vibrating bodies. An energy tunnel may be generated between the plurality of vibrating bodies which resonate with each other in the electromagnetic manner. This may be referred to as energy coupling or energy tail.

The resonance coupling disclosed herein may use an electromagnetic wave having a low frequency. When power is transferred using the electromagnetic wave having the low frequency, only a magnetic field may affect an area located within a single wavelength of the electromagnetic wave. The magnetic resonance may be generated when the wireless power transmitter 100 and the electronic device 200 are located within the single wavelength of the electromagnetic wave having the low frequency.

In this instance, as the energy tail is generated in response to the resonance phenomenon, the form of power transmission may exhibit a non-radiative property. Consequently, upon transferring power using such electromagnetic wave, a radiative problem which occurs frequently may be solved.

The resonance coupling method may be a method for transferring power using the electromagnetic wave with the low frequency, as aforementioned. Thus, the transmitting coil 1111b of the wireless power transmitter 100 may form a magnetic field or electromagnetic wave for transferring power in principle. However, the resonance coupling method will be described hereinafter from the perspective of a magnetic resonance, namely, a power transmission by a magnetic field.

The resonant frequency may be determined by the following formula in Equation 1.

$$f = 1/2\pi\sqrt{LC} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power reception unit 291 of the electronic device 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power reception unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a contactless power transfer method by resonance coupling, when the wireless power transmitter 100 and electronic device 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
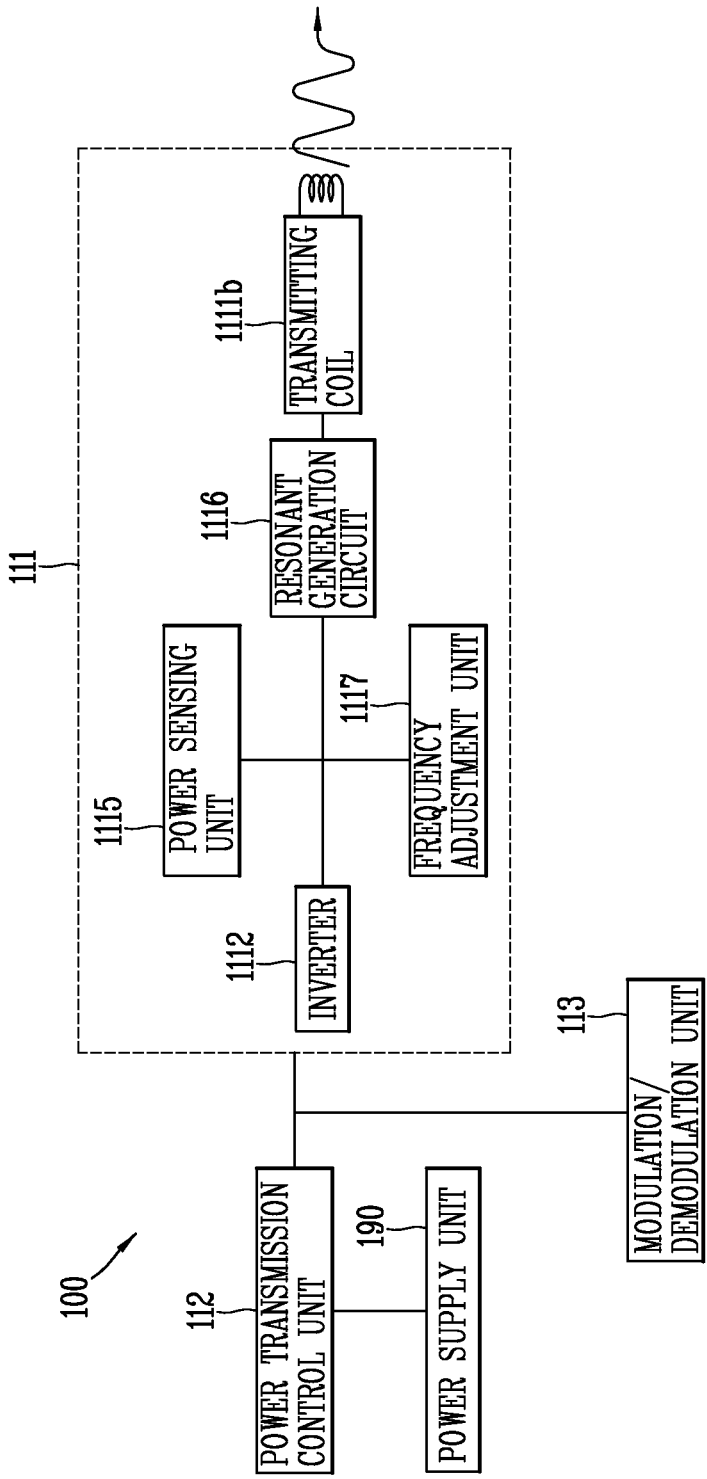
FIGS. 7A and 7B are a block diagram illustrating part of the wireless power transmitter 100 and electronic device 200 in a resonance method that can be employed in the embodiments disclosed herein.
Figure 7B:
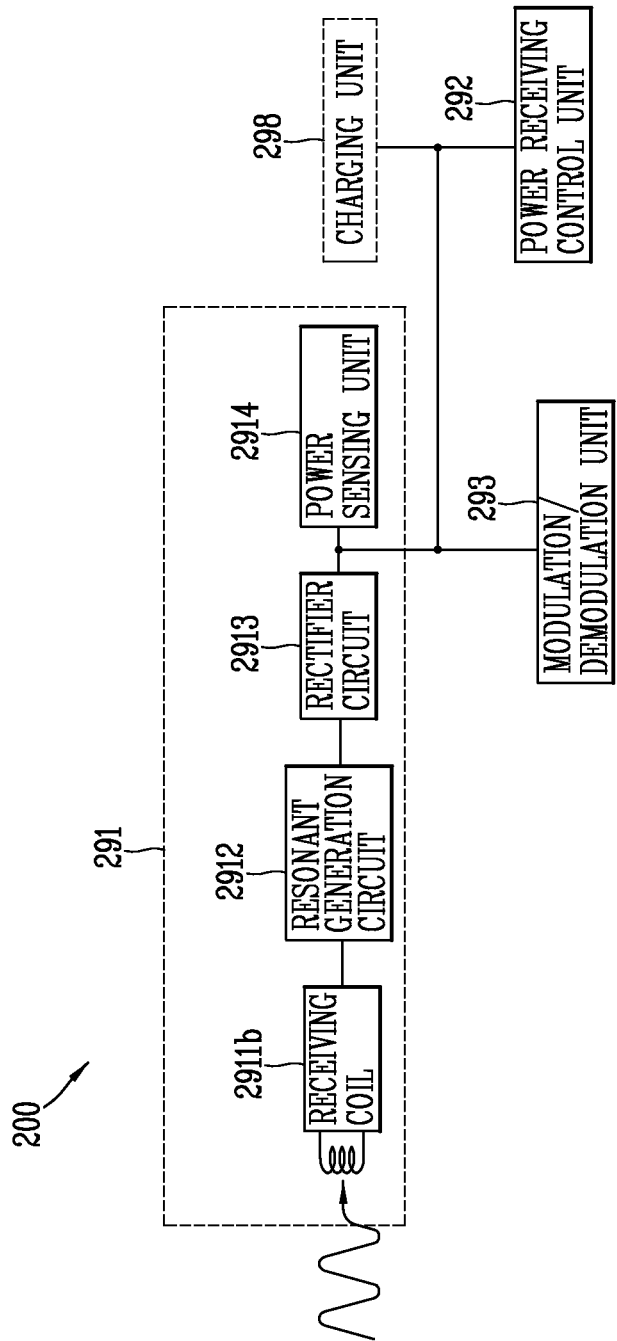

FIGS. 7A and 7B—Wireless Power Transmitter in Resonance Coupling Method

FIGS. 7A and 7B are block diagrams illustrating part of the wireless power transmitter 100 and electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, may include the receiving (Rx) coil 2911b and resonant circuit 2912.

In addition, the power reception unit 291 of the power supply unit 290 may further include a rectifier 2913 for converting an AC current generated by resonance phenomenon into DC. The rectifier 2913 may be configured similarly to the foregoing description.

Furthermore, the power reception unit 291 may further include a power sensing unit 2914 for monitoring a voltage and/or current of the rectified power. The power sensing unit 2914 may be configured similarly to the foregoing description.

FIG. 8—Wireless Power Transmitter Configured to Include One or More Transmitting Coils FIG. 8 is a block diagram illustrating a wireless power transmitter configured to have one or more transmission coils receiving power according to an resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

In the meantime, when one or more electronic devices 200 are disposed in an active area or a detection area of the wireless power transmitter 100 including the one or more transmitting coils 1111b-1 to 1111b-n, the power transmission control unit 112 may control the multiplexer 1113 to allow the electronic devices to be placed in different resonance coupling relations. Accordingly, the wireless power transmitter 100 may wirelessly transfer power to the one or more electronic devices by generating the wireless power signal using different coils.

In addition, the power transmission control unit 112 may set power with a different characteristic to be supplied to each of the coils corresponding to the electronic devices. Here, the wireless power transmitter 100 may transfer power by differently setting a power transmission scheme, a resonant frequency, efficiency, a characteristic and the like for each electronic device.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

Figure 9:
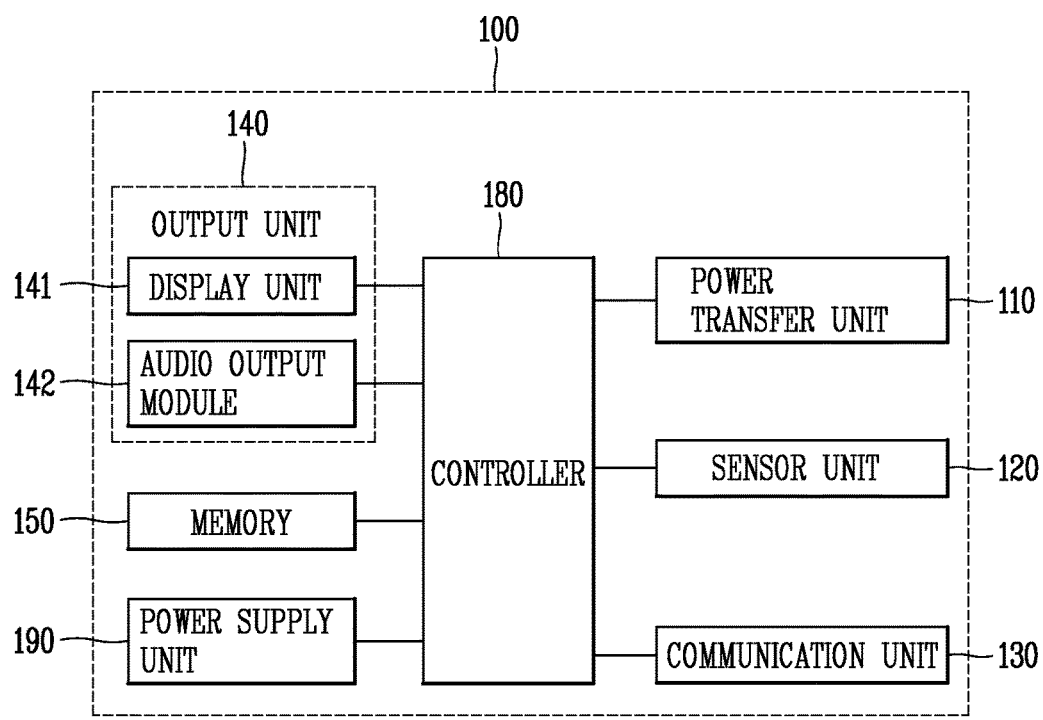
FIG. 9 is a block diagram illustrating a wireless power transmitter further comprising components in addition to those components illustrated in FIG. 2A.

FIG. 9—Wireless Power Transmitter Implemented as Charger

On the other hand, hereinafter, an example of the wireless power transmitter implemented in the form of a wireless charger will be described.

FIG. 9 is a block diagram illustrating a wireless power transmitter further including an additional element in addition to the configuration illustrated in FIG. 2A.

Referring to FIG. 9, the wireless power transmitter 100 may further include a sensor unit 120, a communication unit 130, an output unit 140, a memory 150, and a control unit 180 in addition to the power transmission unit 110 and power supply unit 190 for supporting at least one of the foregoing inductive coupling method and resonance coupling method.

The control unit 180 controls the power transmission unit 110, the sensor unit 120, the communication unit 130, the output unit 140, the memory 150, and the power supply unit 190.

The control unit 180 may be implemented by a module separated from the power transmission control unit 112 in the power transmission unit 110 described with reference to FIGS. 2A and 2B or may be implemented by a single module.

The sensor unit 120 may include a sensor for detecting the location of the electronic device 200. The location information detected by the sensor unit 120 may be used for allowing the power transmission unit 110 to transfer power in an efficient manner.

For instance, in case of wireless power transfer according to the inductive coupling method, the sensor unit 120 may be operated as a detection unit, and the location information detected by the sensor unit 120 may be used to move or rotate the transmitting coil 1111a in the power transmission unit 110.

Furthermore, for example, the wireless power transmitter 100 configured to include the foregoing one or more transmitting coils may determine coils that can be placed in an inductive coupling relation or resonance coupling relation to the receiving coil of the electronic device 200 among the one or more transmitting coils based on the location information of the electronic device 200.

On the other hand, the sensor unit 120 may be configured to monitor whether or not the electronic device 200 approaches a chargeable region. The approach or non-approach detection function of the sensor unit 120 may be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 may include an electronic component for at least any one of Bluetooth™, Zigbee, Ultra Wide Band (UWB), Wireless USB, Near Field Communication (NFC), and Wireless LAN.

The output unit 140 may include at least one of a display unit 141 and an audio output unit 142. The display unit 141 may include at least one of a liquid crystal display (LCD), a thin film transistor-liquid crystal display (TFT-LCD), an organic light-emitting diode (OLED), a flexible display, and a three-dimensional (3D) display. The display unit 141 may display a charging state under the control of the control unit 180.

The memory 150 may include at least one storage medium of a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. The wireless power transmitter 100 may operate in association with a web storage performing the storage function of the memory 150 on the Internet. A program or commands performing the foregoing functions of the wireless power transmitter 100 may be stored in the memory 150. The control unit 180 may perform the program or commands stored in the memory 150 to transmit power in a wireless manner. A memory controller (not shown) may be used to allow other constituent elements (e.g., control unit 180) included in the wireless power transmitter 100 to access the memory 150.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

Figure 10:
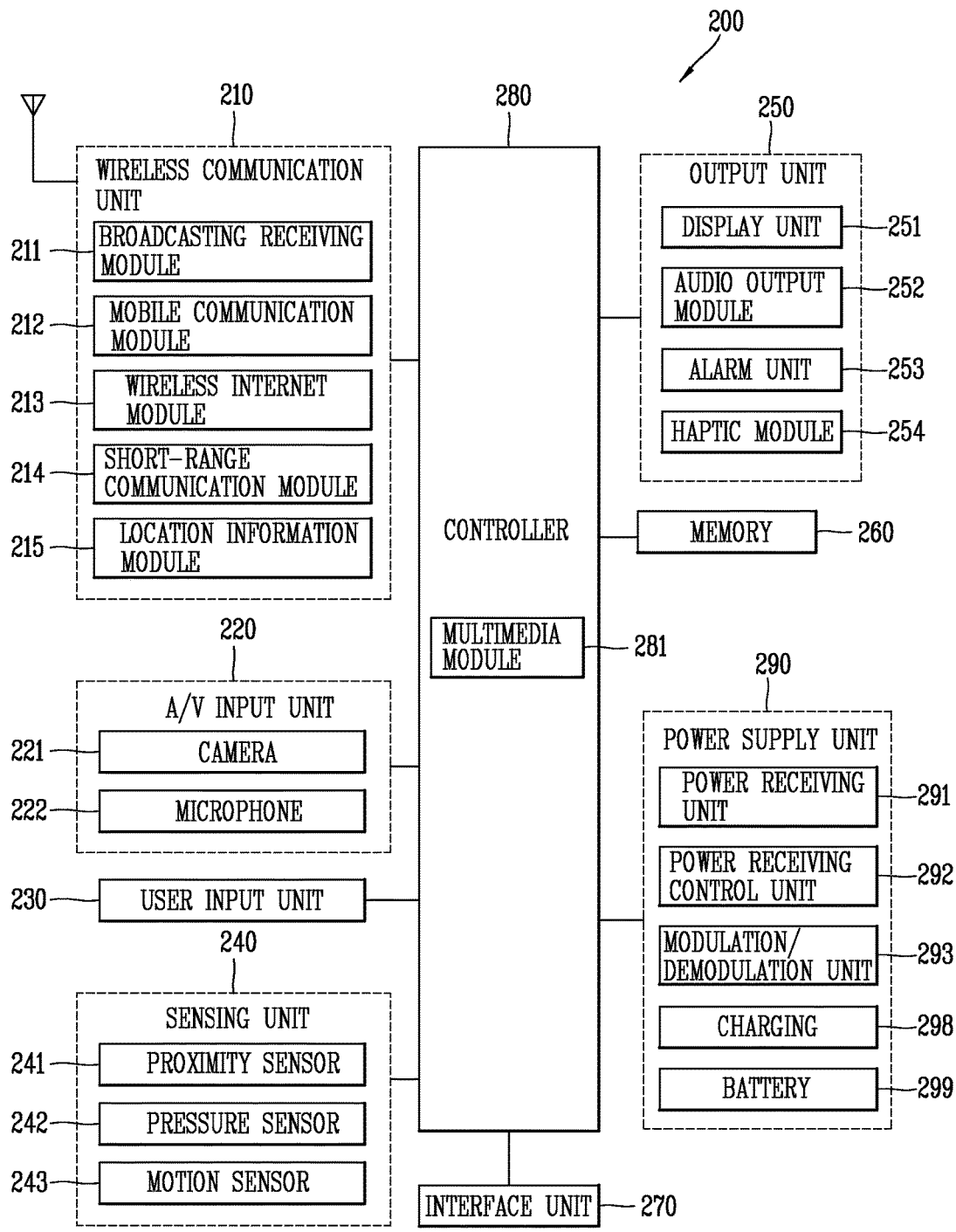
FIG. 10 is a view illustrating a configuration when an electronic device 200 is implemented in the form of a mobile terminal in accordance with embodiments disclosed herein.

FIG. 10—Wireless Power Receiver Implemented as Mobile Terminal

FIG. 10 is view illustrating a configuration in case where an electronic device 200 according to the embodiments disclosed herein is implemented in the form of a mobile terminal.

The mobile communication terminal 200 may include a power supply unit 290 illustrated in FIG. 2A, 2B, 4A, 4B, 7A or 7B.

Furthermore, the terminal 200 may further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components may alternatively be implemented.

Hereinafter, each component is described in sequence.

The wireless communication unit 210 may typically include one or more modules which permit wireless communications between the terminal 200 and a wireless communication system or between the terminal 200 and a network within which the terminal 200 is located. For example, the wireless communication unit 210 may include a broadcast receiving module 211, a mobile communication module 212, a wireless internet module 213, a short-range communication module 214, a position location module 215 and the like.

The broadcast receiving module 211 receives a broadcast signal and/or broadcast associated information from an external broadcast managing entity via a broadcast channel.

The broadcast channel may include a satellite channel and a terrestrial channel. The broadcast center may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may denote information associated with a broadcast channel, a broadcast program, a broadcast service provider, and the like. The broadcast associated information may be provided via a mobile communication network. In this case, it may be received by the mobile communication module 212.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 211 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 may be configured to be suitable for every broadcast system transmitting broadcast signals as well as the digital broadcasting systems.

Broadcast signals and/or broadcast associated information received via the broadcast receiving module 211 may be stored in a suitable device, such as a memory 260.

The mobile communication module 212 transmits/receives wireless signals to/from at least any one of a base station, an external portable terminal, and a server on a mobile communication network. The wireless signal may include audio call signal, video (telephony) call signal, or various formats of data according to transmission/reception of text/multimedia messages.

The wireless internet module 213 supports wireless Internet access for the mobile terminal 200. This module may be internally or externally coupled to the terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module may include Bluetooth, Radio Frequency IDentification (RFID), Infrared Data Association (IrDA), Ultra-WideBand (UWB), ZigBee, and the like. On the other hand, Universal Serial Bus (USB), IEEE 1394, Thunderbolt, and the like, may be used for wired short-range communication.

The wireless internet module 213 or the short-range communication module 214 may establish data communication connection to the wireless power transmitter 100.

Through the established data communication, when there is an audio signal to be outputted while transferring power in a wireless manner, the wireless internet module 213 or the short-range communication module 214 may transmit the audio signal to the wireless power transmitter 100 through the short-range communication module. Furthermore, through the established data communication, when there is information to be displayed, the wireless internet module 213 or the short-range communication module 214 may transmit the information to the wireless power transmitter 100. Otherwise, the wireless internet module 213 or the short-range communication module 214 may transmit an audio signal received through a microphone integrated in the wireless power transmitter 100. Furthermore, the wireless internet module 213 or the short-range communication module 214 may transmit the identification information (e.g., phone number or device name in case of a portable phone) of the mobile terminal 200 to the wireless power transmitter 100 through the established data communication.

The position location module 215 is a module for acquiring a position of the terminal. An example of the position location module 215 may include a Global Position System (GPS) module.

Referring to FIG. 10, the A/V input unit 220 is configured to provide audio or video signal input to the portable terminal. The A/V input unit 220 may include a camera 221 and a microphone 222. The camera 221 processes image frames of still or moving images obtained by an image sensor in a video call mode or a capture more. The processed image frames may be displayed on the display unit 251.

The image frames processed by the camera 221 may be stored in the memory 260 or transmitted to the exterior via the wireless communication unit 210. Two or more cameras 221 may be provided therein according to the use environment.

The microphone 222 may receive an external audio signal by a microphone in a phone call mode, a recording mode, a voice recognition mode, or the like to process it into electrical audio data. The processed audio data is converted and outputted into a format transmittable to a mobile communication base station via the mobile communication module 212 in case of the phone call mode. The microphone 222 may include various noise removal algorithms to remove noises generated while receiving the external audio signal.

The user input unit 230 may generate input data to allow the user to control the operation of the terminal. The user input unit 230 may include a keypad, a dome switch, a touchpad (e.g., static pressure/capacitance), a jog wheel, a jog switch and the like.

The sensing unit 240 may include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 may detect a proximity object using a change of the AC magnetic field or static magnetic field, a change rate of the electrostatic capacity, or the like. Two or more proximity sensors 241 may be provided according to the aspect of configuration.

The pressure sensor 242 may detect whether or not a pressure is applied to the mobile terminal 200, a size of the pressure, and the like. The pressure sensor 242 may be provided at a portion where the detection of a pressure is required in the mobile terminal 200 according to the use environment. When the pressure sensor 242 is provided in the display unit 251, it may be possible to identify a touch input through the display unit 251 and a pressure touch input by which a pressure larger than the touch input is applied according to a signal outputted from the pressure sensor 242. Furthermore, it may be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis may be required according to the use environment. Accordingly, when an acceleration sensor in the direction of X-axis or Y-axis should be used instead of the direction of Z-axis due to any reason, the acceleration sensor may be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor may detect each rotational angle, i.e., azimuth, pitch and roll, with reference to three directional axes.

The output unit 250 is provided to output visual, auditory, or tactile information. The output unit 250 may include a display unit 251, an audio output module 252, an alarm unit 253, a haptic module 254, and the like.

The display unit 251 may display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 may display images captured and/or received, UI, or GUI.

The display unit 251 may include at least one of a liquid crystal display (LCD), a thin film transistor-liquid crystal display (TFT-LCD), an organic light-emitting diode (OLED), a flexible display, a three-dimensional (3D) display, and the like.

Some of those displays may be configured as a transparent type or an light transmission type through which the outside is visible, which is referred to as a transparent display. A representative example of the transparent display may include a Transparent OLED (TOLED), or the like. The rear surface of the display unit 151 may also be implemented to be optically transparent. Under this configuration, the user can view an object positioned at a rear side of the terminal body through a region occupied by the display unit 251 of the terminal body.

The display unit 251 may be implemented in two or more in number according to a configured aspect of the terminal 200. For instance, a plurality of the display units 251 may be arranged on one surface to be spaced apart from or integrated with each other, or may be arranged on different surfaces.

Here, if the display unit 251 and a touch sensitive sensor (referred to as a touch sensor) have a layered structure therebetween, the display unit 251 may be used as an input device rather than an output device. The touch sensor may be implemented as a touch film, a touch sheet, a touch pad, and the like.

The touch sensor may be configured to convert changes of a pressure applied to a specific part of the display unit 251, or a capacitance occurring from a specific part of the display unit 251, into electric input signals. Also, the touch sensor may be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 may sense which region of the display unit 151 has been touched.

The proximity sensor 241 may be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 252 may output audio data received from the wireless communication unit 210 or stored in the memory 260, in a call-receiving mode, a call-placing mode, a recording mode, a voice recognition mode, a broadcast reception mode, and so on. The audio output module 252 may output audio signals relating to functions performed in the terminal 200, e.g., sound alarming a call received or a message received, and so on. The audio output module 252 may include a receiver, a speaker, a buzzer, and so on.

The alarm 253 outputs signals notifying the occurrence of an event from the terminal 200. The event occurring from the terminal 100 may include call received, message received, key signal input, touch input, and so on. The alarm 253 may output not only video or audio signals, but also other types of signals such as signals notifying occurrence of events in a vibration manner. Since the video or audio signals can be output through the display unit 251 or the audio output unit 252, the display unit 251 and the audio output module 252 may be categorized into part of the alarm 253.

The haptic module 254 generates various tactile effects which a user can feel. A representative example of the tactile effects generated by the haptic module 254 includes vibration. Vibration generated by the haptic module 254 may have a controllable intensity, a controllable pattern, and so on. For instance, different vibration may be output in a synthesized manner or in a sequential manner.

The haptic module 254 may generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 may be configured to transmit tactile effects through the user's direct contact, or the user's muscular sense using a finger or a hand. The haptic module 254 may be implemented in two or more in number according to the configuration of the terminal 200.

The memory 260 may store a program for the processing and control of the controller 280. Alternatively, the memory 260 may temporarily store input/output data (e.g., phonebook data, messages, still images, video and the like). Also, the memory 260 may store data related to various patterns of vibrations and audio output upon the touch input on the touch screen.

In some embodiments, software components including an operating system (not shown), a module performing a wireless communication unit 210 function, a module operating together with the user input unit 230, a module operating together with the A/V input unit 220, a module operating together with the output unit 250 may be stored in the memory 260. The operating system (e.g., LINUX, UNIX, OS X, WINDOWS, Chrome, Symbian, iOS, Android, VxWorks, or other embedded operating systems) may include various software components and/or drivers to control system tasks such as memory management, power management, and the like.

In addition, the memory 260 may store a setup program associated with contactless power transfer or wireless charging. The setup program may be implemented by the controller 280.

Furthermore, the memory 260 may store an application associated with contactless power transfer (or wireless charging) downloaded from an application providing server (for example, an app store). The wireless charging related application is a program for controlling wireless charging transmission, and thus the electronic device 200 may receive power from the wireless power transmitter 100 in a wireless manner or establish connection for data communication with the wireless power transmitter 100 through the relevant program.

The memory 260 may be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 may be operated in association with a web storage performing the storage function of the memory 160 on the Internet.

The interface unit 270 may generally be implemented to interface the portable terminal with all external devices. The interface unit 270 may allow a data reception from an external device, a power delivery to each component in the terminal 200, or a data transmission from the terminal 200 to an external device. The interface unit 270 may include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module may be configured as a chip for storing various information required to authenticate an authority to use the terminal 200, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 200 via a port.

Also, the interface unit may serve as a path for power to be supplied from an external cradle to the terminal 200 when the terminal 100 is connected to the external cradle or as a path for transferring various command signals inputted from the cradle by a user to the terminal 200. Such various command signals or power inputted from the cradle may operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 may include a multimedia module 281 for multimedia playback. The multimedia module 281 may be implemented within the controller 280, or implemented separately from the controller 280.

The controller 280 can perform a pattern recognition processing so as to recognize a writing input or image drawing input carried out on the touch screen as a text or image.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the power reception control unit 292 within the power supply unit 290 may be implemented to be included in the controller 280, and in the present disclosure, it should be understood that the controller 280 performs the operation by the power reception control unit 292.

The power supply unit 290 receives internal and external power under the control of the controller 280 to supply power required for the operation of each constituent element.

The power supply unit 290 is provided with a battery 299 for supplying power to each constituent element of the terminal 200, and the battery 299 may include a charger 298 for performing wired or wireless charging.

The present disclosure discloses a mobile terminal as an example of the apparatus for receiving power in a wireless manner, but it would be easily understood by those skilled in the art that the configuration according to the embodiment disclosed herein may be applicable to a stationary terminal, such as a digital TV, a desktop computer, and the like, excluding a case where it is applicable to only the mobile terminal.

Hereinafter, the configuration of a mobile terminal to which a wireless power receiver is applied will be described in more detail with reference to FIGS. 11 to 13.

Figure 11:
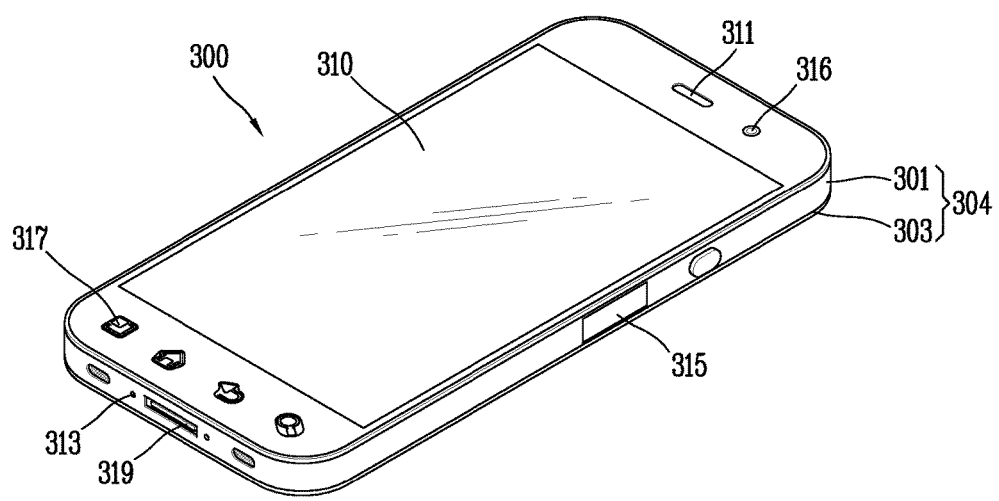
FIG. 11 is a front perspective view of a mobile terminal in accordance with one embodiment disclosed herein.
Figure 12:
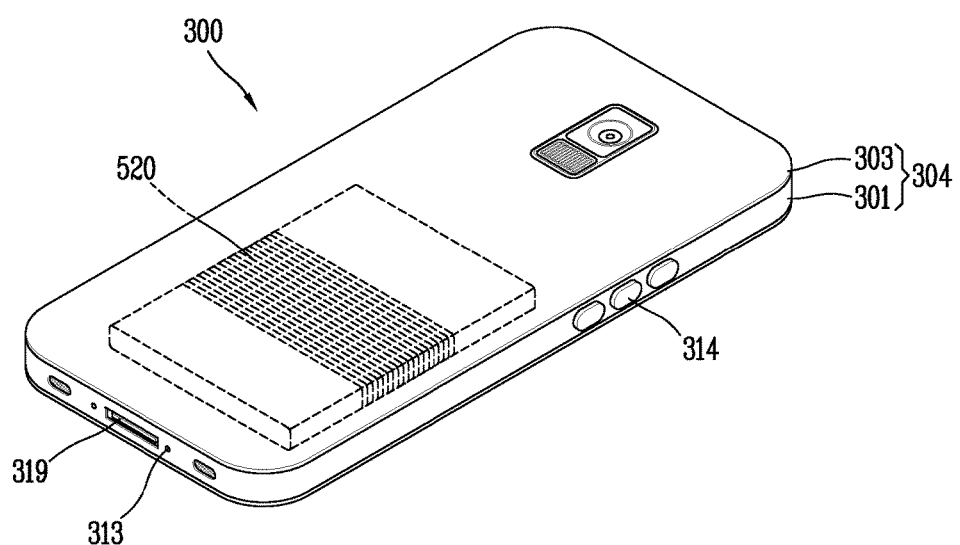
FIG. 12 is a rear perspective view of the mobile terminal of FIG. 11.

FIG. 11 is a front perspective view of a mobile terminal in accordance with one embodiment disclosed herein, and FIG. 12 is a rear perspective view of the mobile terminal of FIG. 11.

As illustrated in FIGS. 11 and 12, a mobile terminal 300 may include a bar-like terminal body 304. However, the mobile terminal 300 may alternatively be implemented in any of a variety of different configurations. Examples of such configurations include a slide-type, folder-type, swing-type, and the like. In addition, the mobile terminal described in this specification may also be applied to arbitrary portable electronic devices having a camera and a flash, for example, a cellular phone, a smart phone, a notebook computer, a digital broadcasting terminal, personal digital assistants (PDA), a portable multimedia player (PMO), and the like.

The mobile terminal 300 disclosed herein includes the terminal body 304 forming its outer appearance.

A case (casing, housing, cover, etc.) forming the appearance of the terminal body 304 is formed by a front case 301, a rear case 302 and a battery case 303. The battery case 303 is configured to cover a rear surface of the rear case 302.

Various electronic components are incorporated into a space formed between the front case 301 and the rear case 302. The cases may be formed by injection-molding a synthetic resin or may be also formed of a metal, for example, stainless steel (STS), titanium (Ti), or the like.

A display unit 310, a first audio output module 311, a front camera 316, a side key 314, an interface unit 315 and a signal input unit 317 are provided on a front surface of the terminal body 304.

The display unit 310 may include a Liquid Crystal Display (LCD) module, an Organic Light-Emitting Diode (OLED) module, an e-paper or the like which outputs visual information. The display unit 310 may include a touch sensing element to receive a control command by a touch method. Hereinafter, the display 310 having the touch sensing element is referred to as 'touch screen.' When a touch is made to one place on the touch screen 310, the content corresponding to the touched place is input. The content entered by a touch method may be a text or numerical value, or a menu item which can be indicated or designated in various modes. The touch sensing element may be formed with transparency to allow visual information displayed on the display unit to be seen, and may include a structure for enhancing visibility of a touch screen at bright places. The touch screen 310 occupies a most portion of the front surface of the front case 301.

The first audio output module 316 may be implemented in the form of a receiver for transferring voice sounds to the user's ear or a loud speaker for outputting various alarm sounds or multimedia reproduction sounds.

The front camera 316 processes image frames such as still or moving images obtained by the image sensor in a video call mode or a capture mode. The processed image frames may be displayed on the display unit 310.

The image frames processed in the front camera 316 may be stored in the memory 160 or externally transmitted through the wireless communication unit 110. At least two or more front cameras 316 may be provided according to usage environments.

The signal input unit 317 is manipulated by a user to input commands for controlling operations of the mobile terminal 300, and may include a plurality of input keys. The input keys may also be commonly referred to as a manipulating portion, and may employ any tactile method that allows the user to perform manipulation with a tactile feeling. The content input by the signal input unit 317 may be set in various ways. For example, the signal input unit 317 may be used by a user to input start, end, scroll, and the like.

The side key 314, the interface unit 315 and the audio input module 313 may be provided on side surfaces of the front case 301.

The side key 314 may be commonly referred to as a manipulating portion, and be manipulated by a user to input commands for controlling operations of the mobile terminal 300. The side key 314 may employ any tactile method that allows the user to perform manipulation with a tactile feeling. The content input by the side key 314 may be set in various ways. For example, the side key 316 may be manipulated by a user to input a command, such as controlling image input unit 316, 221, controlling a volume level being output from the audio output module 311, switching into a touch recognition mode of the display u nit 310, or the like.

The audio input module 313 may be implemented in the form of a microphone for receiving user's voice and other sounds.

The interface unit 315 may serve as a path allowing the mobile terminal 100 to exchange data with external devices. For example, the interface unit 315 may be at least one of a connection terminal for connecting to an earphone in a wired or wireless manner, a port for near field communication (for example, an Infrared Data Association (IrDA) port, a Bluetooth port, a wireless LAN port, and the like), or a power supply terminal for supplying power to the mobile terminal 300. The interface unit 315 may be implemented in the form of a socket for accommodating an external card, such as Subscriber Identification Module (SIM), User Identity Module (UIM), or a memory card for information storage.

A power supply unit 340 (see FIG. 13) and a rear camera 321 are provided on a rear surface of the terminal body 304.

A flash and a mirror may be additionally disposed adjacent to the rear camera 321. When an image of a subject is captured with the rear camera 321, the flash may illuminate the subject. The mirror may allow the user to see himself or herself when he or she wants to capture his or her own image (i.e., self-image capturing) by using the rear camera 321.

The rear camera 321 may be a camera which includes an image capturing direction that is substantially opposite to the image capturing direction of the front camera 316, and has a different number of pixels from that of the front camera 316.

For example, it may be preferable that the front camera 316 has a smaller number of pixels to capture an image of the user's face and transmits such image to another party during a video call, and the rear camera 321 preferably has a larger number of pixels to capture an image of a general object and not immediately transmits it in most cases. The front and rear cameras 316 and 321 may be installed on the terminal body 304 such that they can be rotatable or popped up.

The battery 340 supplies power to the mobile terminal 300. The battery 340 may be mounted in the terminal body 304, or detachably coupled directly to an outer side of the terminal body 304.

A power reception unit 520 having an RX coil may be configured to charge the battery.

Figure 13:
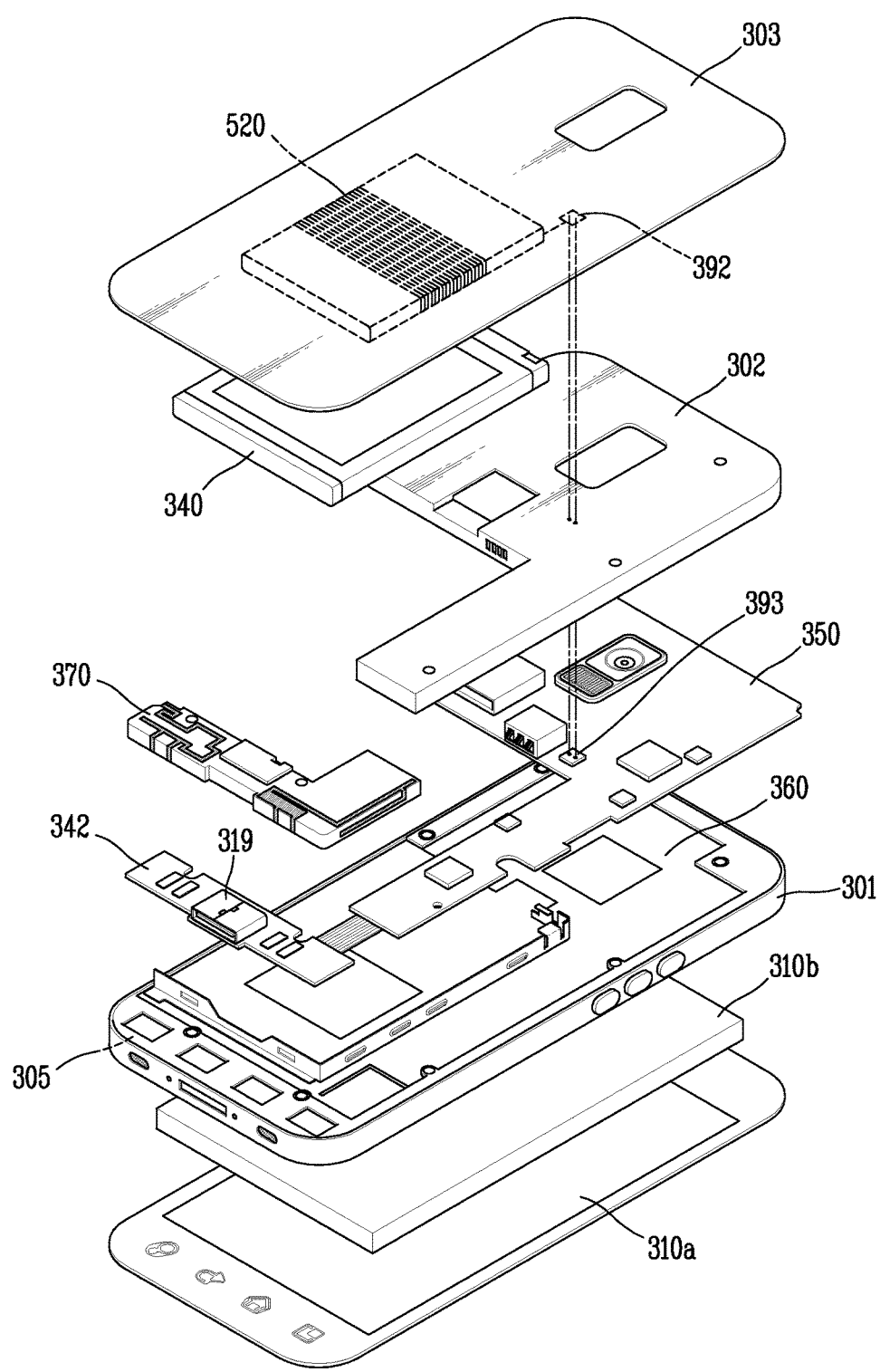
FIG. 13 is a disassembled perspective view of FIG. 12.

FIG. 13 is a disassembled perspective view of FIG. 12.

Referring to FIG. 13, the mobile terminal includes a window 310a and a display module 310b constructing the display unit 310. The window 310a may be coupled to one surface of the front case 301. The window 310a and the display module 310b may be integrally formed with each other.

A frame 360 is formed between the front case 301 and the rear case 302 to support electric elements. The frame 360 is an internal structure of the terminal, and may support at least one of, for example, the display module 310b, the camera module 321, an antenna device, the battery 340 or a circuit board 350.

The frame 360 may be partially exposed to the outside of the terminal. Also, the frame 360 may construct a part of a sliding module which connects a body part and a display unit to each other in a slide-type terminal other than the bar-type terminal.

The one example illustrated in FIG. 13 shows that the circuit board 350 is disposed between the frame 360 and the rear case 301 and the display module 310b is coupled to one surface of the frame 360. Alternatively, the circuit board 350 and the battery may be disposed on another surface of the frame 360 and the battery case 303 may be coupled to the rear case 302 to cover the battery.

The window 310a is coupled to one surface of the frame case 301. A touch sensing pattern 310c which is sensitive to a touch may be formed on one surface of the window 310a. The touch sensing pattern 310c is configured to sense a touch input and be light-transmittable. The touch sensing pattern 310c is mounted on a front surface of the window 310c and may be configured to convert a change in a voltage generated at a specific portion of the window 310c into an electric input signal.

The display module 310b is disposed on a rear surface of the window 310a. This embodiment illustrates a thin film transistor liquid crystal display (TFT LCD) as an example of the display module 310b, but the present invention may not be limited to this.

For example, the display module 310b may be an LCD, an OLED, a flexible display, a 3D display and the like.

The circuit board 350, as aforementioned, may be formed on one surface of the frame 360, but may also be mounted below the display module 310b. At least one electronic element is mounted on a lower surface of the circuit board 350.

The frame 360 is provided with an accommodating portion which is in a recessed shape such that the battery 340 can be accommodated therein. A contact portion 319 which is connected to the circuit board 350 such that the battery 340 can supply power to the terminal body may be formed at one side surface of the battery accommodating portion.

An antenna device may be provided at an upper or lower end of the mobile terminal. Also, the antenna device may be provided in plurality so as to be disposed at each end portion of the terminal. Each antenna device may be configured to transmit and receive wireless signals of different frequency bands. The antenna device may include conductive patterns formed on one surface of a carrier 370.

The frame 360 may be made of a metallic material to maintain sufficient rigidity even if it is formed thin. The metallic frame 360 may operate as a ground. That is, the circuit board 350 or the antenna device may have a ground connection to the frame 360. The frame 360 may operate as a ground of the circuit board 350 or the antenna device. In this instance, the frame 360 may extend the ground of the mobile terminal.

The circuit board 350 is electrically connected to the antenna device, and processes wireless signals (or wireless electromagnetic waves) transmitted and received through the antenna device. For processing the wireless signals, a plurality of transmission/reception circuits may be formed or mounted on the circuit board 350.

The transmitting/receiving circuits may include at least one integrated circuit and related electric elements. For example, the transmitting/receiving circuits may include a transmission integrated circuit, a reception integrated circuit, a switching circuit, an amplifier and the like.

The plurality of transmitting/receiving circuits may simultaneously feed conductive members which are configured as conductive patterns as radiators, and accordingly the plurality of antenna devices can operate at the same time.

For example, when one circuit performs transmission, another circuit may perform reception, or both circuits may perform transmission or reception.

A coaxial cable may be provided to connect each antenna device to the circuit board. For example, the coaxial cable may be connected to feeders which feed the antenna devices. The feeders may be provided on one surface of a flexible circuit board 342 to process signals input from a manipulating portion 317. Another surface of the flexible circuit board 342 may be coupled to a signal transfer unit which is configured to transfer the signal of the manipulating portion 317. In this instance, a dome may be formed on the another surface of the flexible circuit board 342 and an actuator may be provided at the signal transfer unit.

Figure 14:
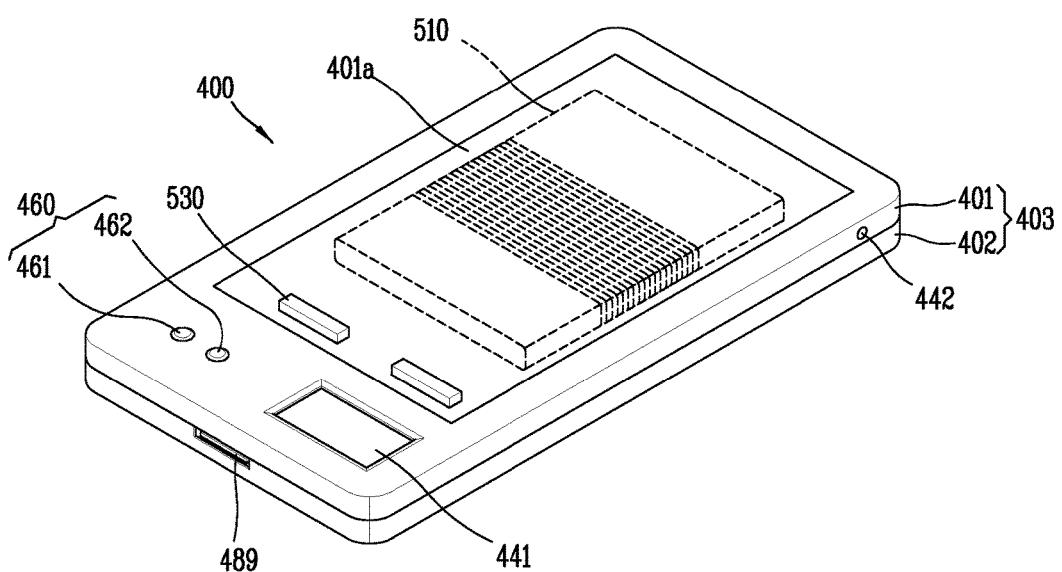
FIG. 14 is a front perspective view of a wireless power transmitter in accordance with one embodiment disclosed herein.

FIG. 14 is a front perspective view of a wireless power transmitter in accordance with one embodiment disclosed herein.

A body 403 of a wireless power transmitter (wireless power transfer device, etc.) includes a case (casing, housing, cover, etc.) forming an appearance. In this embodiment, the case may be divided into a front case 401 and a rear case 402. Various electronic components are incorporated into a space formed between the front case 401 and the rear case 402. At least one intermediate case may further be provided between the front case 401 and the rear case 402.

The cases may be formed by injection-molding a synthetic resin or may also be formed of a metal, for example, stainless steel (STS), titanium (Ti), or the like.

An output unit such as a display unit or an audio output module, a user input unit, a socket 489 through which power is supplied to the body, an interface (not illustrated) coupled to an external device may be disposed on the body.

A display unit 441 may be provided on an upper surface of the front case 401. A user input unit 460, the socket 489 and the like may be provided on side surfaces of the front case 401 and the rear case 402.

The user input unit 460 may be manipulated by a user to input commands for controlling operations of the mobile terminal 100, and may include a plurality of manipulation units 461 and 462. The manipulation units 461 and 462 may also be commonly referred to as a manipulating portion, and may employ any tactile method that allows the user to perform manipulation with a tactile feeling.

The content input by the first or second manipulation unit 461 or 462 may be set in various ways. For example, the first manipulation unit 461 may be manipulated by the user to input a command, such as start or end of a charging operation or the like, and the second manipulation unit 462 may be manipulated by the user to input a command, such as controlling a volume level of sounds output from an audio output module 442, adjusting brightness of the display unit 441, or the like.

A mounting surface 401*a* on which an electronic device 200 to be charged is placed is formed on an upper surface of the body 403. When the electronic device 200 is placed on the mounting surface 401*a*, a detection sensor included in the body 403 may sense the placed electronic device 200 and wireless charging may be started.

Also, a power transmission unit 510 including a TX coil may be provided. Stopper 530 which restrict a movement of the electronic device when the electronic device is placed may be formed on the mounting surface 401*a*.

Figure 15A:
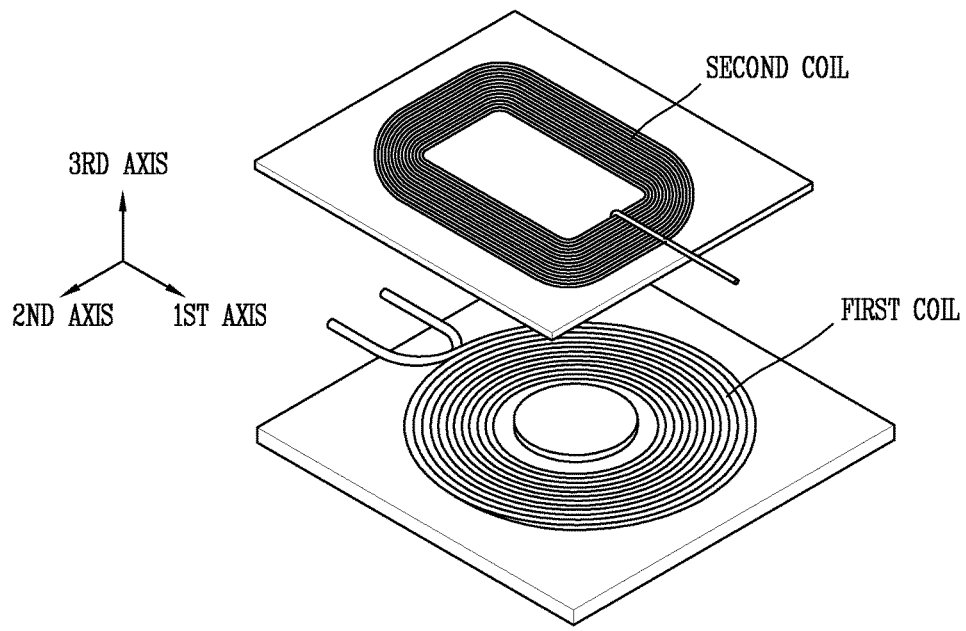
FIG. 15A is a conceptual view illustrating one example of a coil arrangement constructing a power transmission unit and a power reception unit in accordance with a comparative embodiment disclosed herein.
Figure 15B:
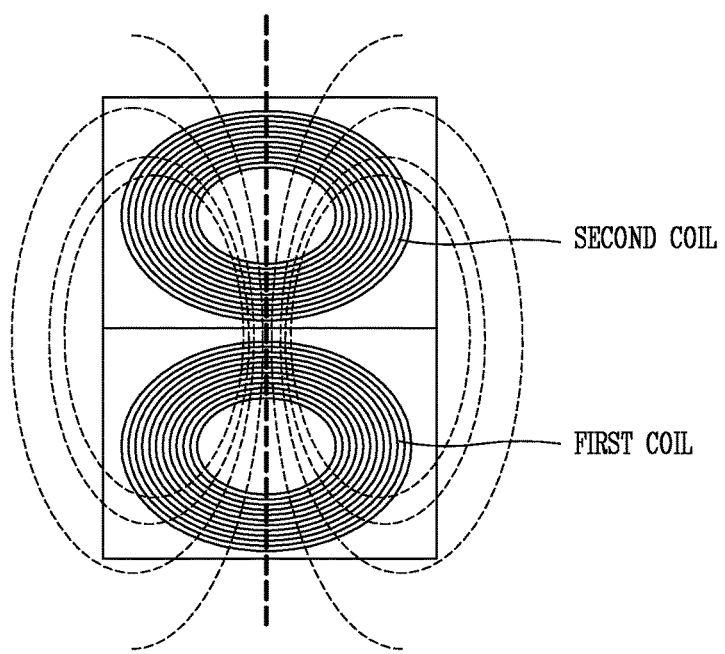
FIG. 15B is a conceptual view illustrating magnetic induction lines in the comparative embodiment illustrated in FIG. 15A.
Figure 15C:
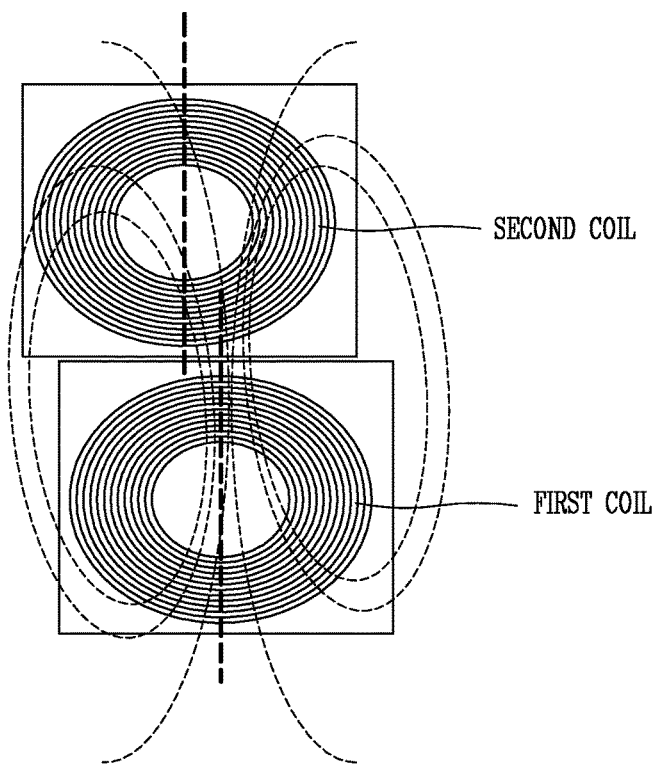
FIG. 15C is a conceptual view illustrating the magnetic induction lines when coils are misaligned in the comparative embodiment illustrated in FIG. 15A.

FIG. 15A is a conceptual view illustrating one example of a coil arrangement constructing a power transmission unit and a power reception unit in accordance with a comparative embodiment disclosed herein, FIG. 15B is a conceptual view illustrating magnetic induction lines in the comparative embodiment illustrated in FIG. 15A, and FIG. 15C is a conceptual view illustrating the magnetic induction lines when coils are misaligned in the comparative embodiment illustrated in FIG. 15A.

Referring to FIG. 15A, a wireless power transmitter (wireless power transfer device, etc.) may include a power transmission unit, and the power transmission unit may include a coil (TX coil, hereinafter, referred to as a first coil). Also, an electronic device may include a power reception unit configured to wirelessly receive power, and the power reception unit may include a coil (RX coil, hereinafter, referred to as a second coil). The first and second coils may be formed on a shielding member or a substrate.

As illustrated in FIG. 15A, the first coil and the second coil may be arranged to face each other during wireless charging. The first coil and the second coil may be wound from their centers toward their outer peripheries by several number of turns or more. That is, the first coil and the second coil are formed on a plane (a planar spiral type) with a first axis and a second axis. The first coil and the second coil are spaced apart from each other in a direction of a third axis.

Here, when a current is applied to the first coil, as illustrated in FIG. 15B, magnetic induction lines are formed from a central portion of the first coil in a direction of passing through a central portion of the second coil.

As aforementioned, wireless power transfer efficiency according to the inductive coupling method is less affected by a frequency characteristic but affected by alignment and distance between the wireless power transmitter 100 and the electronic device 200 each having a coil. That is, as illustrated in FIG. 15B, when the central portion of the first coil and the central portion of the second coil are aligned with each other and simultaneously an appropriate distance in the direction of the third axis is maintained between the first coil and the second coil, the wireless charging efficiency can sufficiently be exhibited.

However, as illustrated in FIG. 15C, when the first coil and the second coil are misaligned, magnetic induction may be insufficiently performed which may result in lowering the wireless charging efficiency. In this manner, when the central portions of the first and second coils are misaligned, the wireless charging efficiency may be lowered. This may require for considering a method of increasing the wireless charging efficiency.

Figure 16:
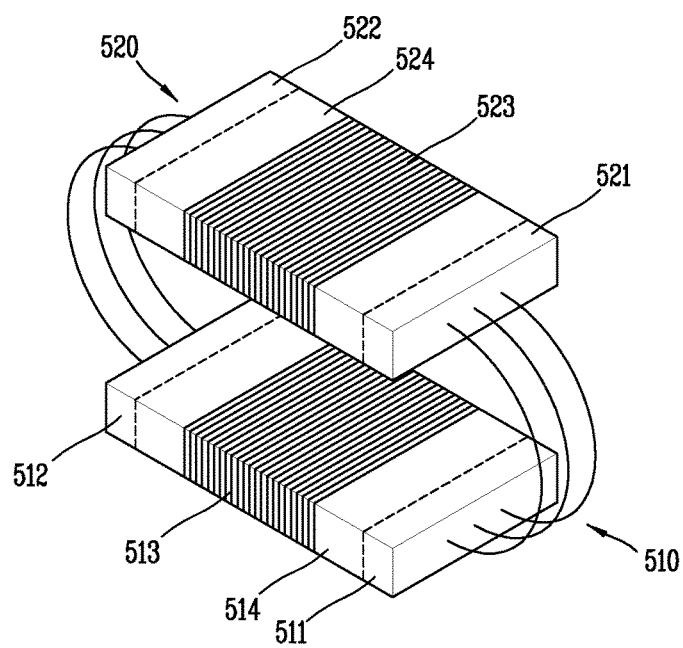
FIG. 16 is a conceptual view of cores and coils constructing a power transmission unit and a power reception unit in accordance with one embodiment disclosed herein.

FIG. 16 is a conceptual view of cores and coils constructing a power transmission unit and a power reception unit in accordance with one embodiment disclosed herein.

Referring to FIG. 16, a wireless power transmitter may include a power transmission unit 510 to transmit power in a wireless manner, and the power transmission unit 510 may include a first coil 513. Also, an electronic device may include a power reception unit 520 to receive power in a wireless manner, and the power reception unit 520 may include a second coil 523. The first and second coils 513 and 523 may be formed in a manner of winding along central portions of cores by several numbers of turns or more. Cores 514 and 524 may be formed by containing a ferrite material, and have a polygonal or circular section.

As illustrated in FIG. 16, the first coil 513 and the second coil 523 are arranged to face each other during wireless charging. The first coil 513 and the second coil 523 are wound from centers of the cores 514 and 524 toward both side portions by several number of turns or more. That is, the first coil 513 and the second coil 523 may be implemented in a cylindrical or polygonal solenoid shape. The first coil 513 and the second coil 523 may be arranged to be spaced from each other.

With the structure, magnetic flux concentration portions 511, 512, 521 and 522 with the maximum magnetic flux may be formed at lengthwise side portions of the cores, respectively. In other words, as illustrated in FIG. 16, when each of the power transmission unit 510 and the power reception unit 520 is configured to have the coil and the core in the cylindrical or polygonal solenoid shape, the magnetic flux concentration portions 511, 512, 521 and 522 may be formed at both ends of the cores 514 and 524, respectively.

This structure of the coil and the core may allow for sufficient magnetic induction even when the first coil 513 and the second coil 523 are misaligned, which may result in ensuring predetermined wireless charging efficiency or more.

The structure of the core and the coil according to embodiments of the present invention will be provided in an electric vehicle and a wireless power transmitter or an electronic device and a wireless power transmitter, respectively.

Hereinafter, such structure will be described in more detail with reference to FIGS. 17A to 19B.

Figure 17A:
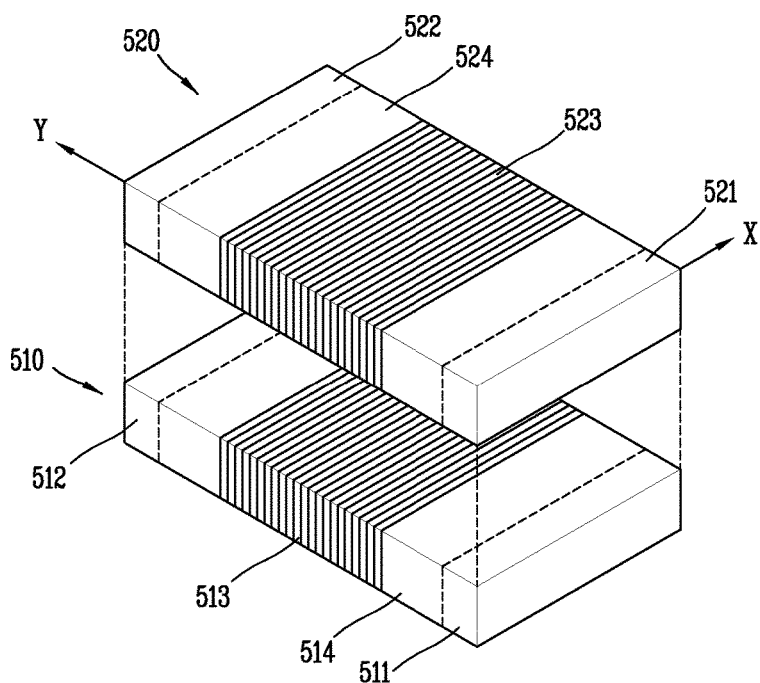
FIG. 17A is a conceptual view illustrating an example in which the cores and the coils illustrated in FIG. 16 are provided in an electric vehicle and a wireless power transmitter or an electronic device and a wireless power transmitter.
Figure 17B:
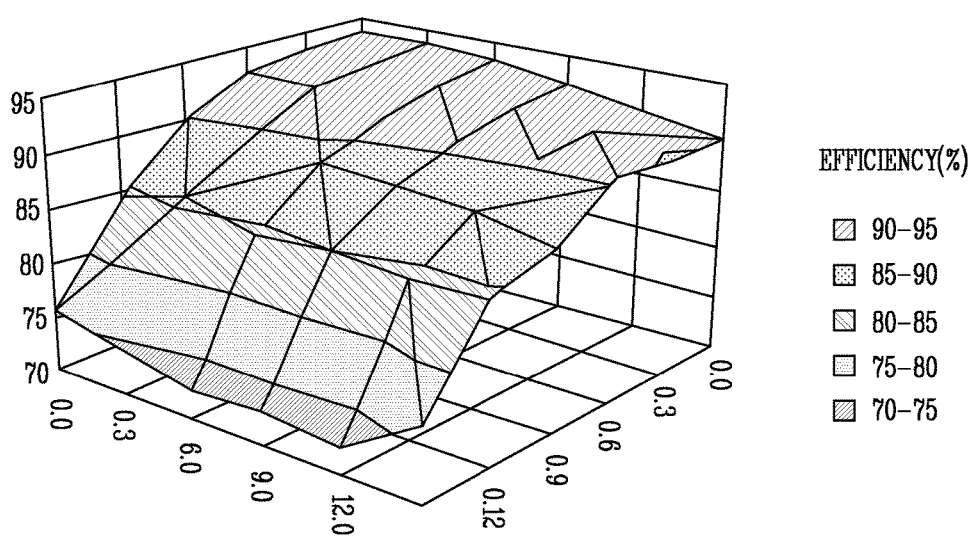
FIG. 17B is a conceptual view illustrating wireless charging efficiency when coils are misaligned in an X-axial or Y-axial direction.

FIG. 17A is a conceptual view illustrating an example in which the cores and the coils illustrated in FIG. 16 are provided in an electric vehicle and a wireless power transmitter or an electronic device and a wireless power transmitter, and FIG. 17B is a conceptual view illustrating wireless charging efficiency when coils are misaligned in an X-axial or Y-axial direction.

Referring to FIG. 17A, the first coil 513 may be fixed in position, and the second coil 523 may be arranged in a manner that its central portion is misaligned with that of the fixed first coil 513 relatively in an X-axial or Y-axial direction. FIG. 17B illustrates each wireless charging efficiency in the arrangement of FIG. 17A, namely, illustrates each wireless charging efficiency when a spaced distance between the coils in a Z-axial direction is fixed and the central portions of the coils are misaligned by a predetermined interval in the X-axial or Y-axial direction. FIG. 17B illustrates that satisfactory wireless charging efficiency is exhibited when the power transmission unit 510 and the power reception unit 520 are formed by using the coils and the cores according to the embodiments of the present invention.

That is, when the magnetic flux concentration portions 511, 512, 521 and 522 are formed at lengthwise side portions of the cores 514 and 524, such satisfactory wireless charging efficiency can be exhibited even though those coils 513 and 523 are misaligned with each other.

Figure 18:
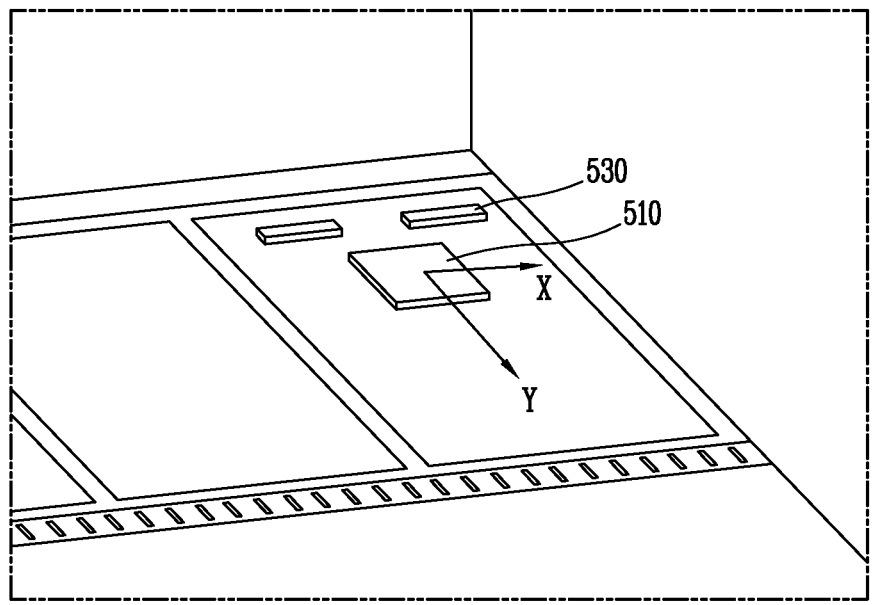
FIG. 18 is a conceptual view illustrating one example of a wireless power transmitter installed at a parking lot.

FIG. 18 is a conceptual view illustrating one example of a wireless power transmitter installed at a parking lot.

A wireless power transmitter according to an embodiment of the present invention may be provided at a parking lot. Stoppers 530 for restricting a movement of the electric vehicle when an electric vehicle is parked may be provided. The stoppers 530 may protrude from one surface, on which the electric vehicle is parked, to guide a parked position of the electric vehicle.

Also, the stoppers 530 may be a type of arrangement indicator which can indicate a position where the electronic device or electric vehicle is to be arranged. The arrangement indicator may indicate a position at which the electric vehicle is to be parked when the electric vehicle is parked at the parking lot.

Figure 19A:
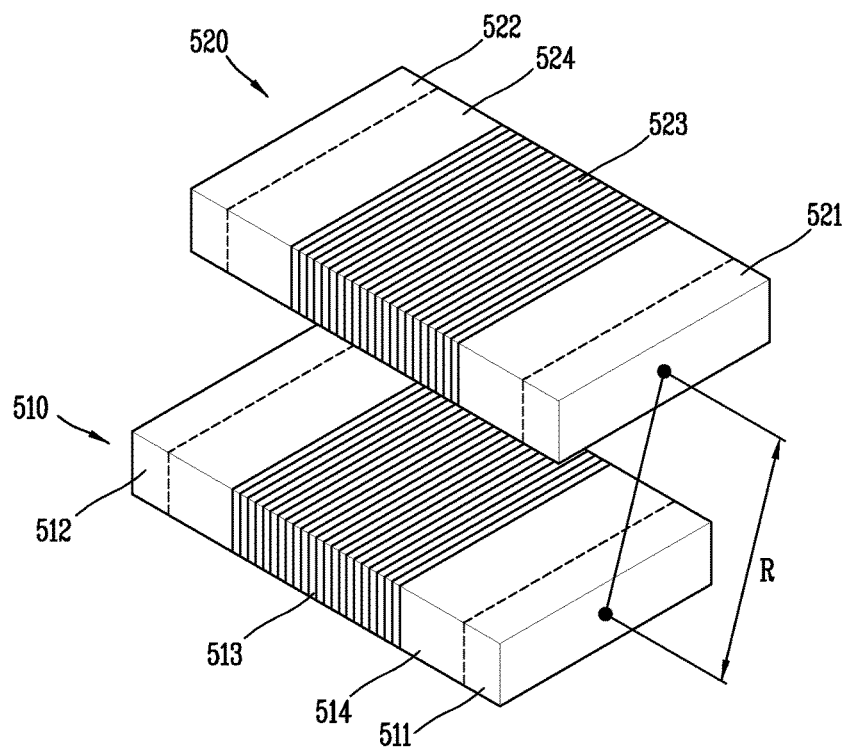
FIGS. 19A and 19B are conceptual views illustrating an alignment state of coils having the same wireless charging efficiency.
Figure 19B:
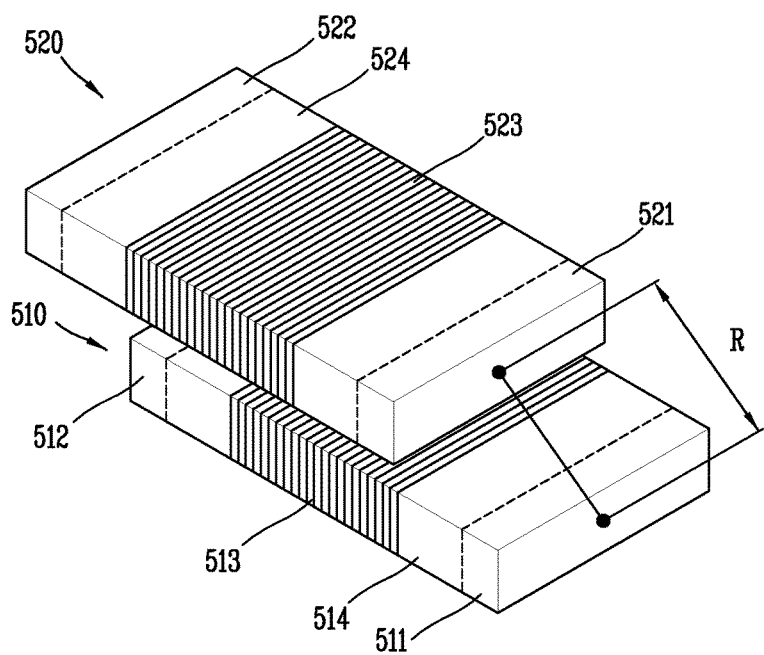

FIGS. 19A and 19B are conceptual views illustrating an alignment state of coils having the same wireless charging efficiency.

As aforementioned, the first coil 513 and the second coil 523 of the power transmission unit 510 and the power reception unit 520 are arranged to face each other during wireless charging. The first coil 513 and the second coil 523 are implemented in the cylindrical or polygonal solenoid shape, and accordingly the magnetic flux concentration portions 511, 512, 521 and 522 with the maximum magnetic flux generated are formed at the lengthwise side portions of the cores 514 and 524.

Accordingly, as illustrated in FIGS. 19A and 19B, when a spaced distance R between the coils is equal, even if the coils are misaligned in the X-axial or Y-axial direction, the same or similar wireless charging efficiency is obtained.

Figure 20A:
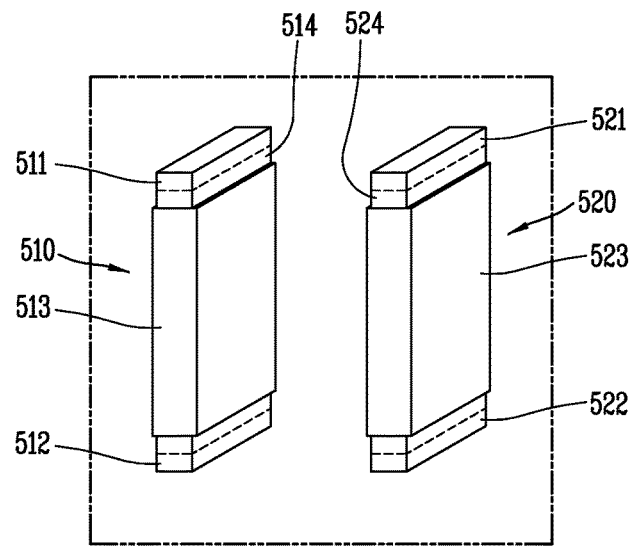
FIG. 20A is a view illustrating cores and coils in accordance with an embodiment disclosed herein.
Figure 20B:
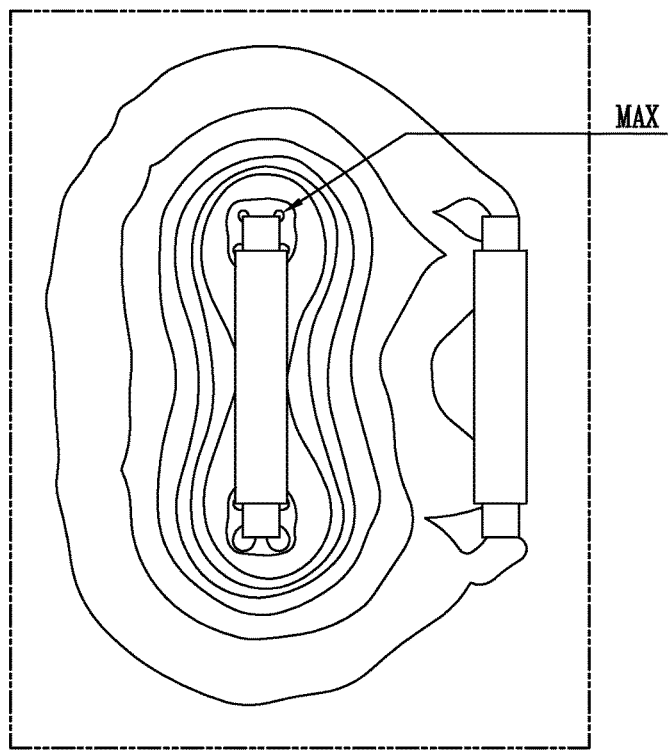
FIG. 20B is a view illustrating distribution of average magnetic flux density in the cores and the coils according to FIG. 20A.

FIG. 20A is a view illustrating cores and coils in accordance with an embodiment disclosed herein, and FIG. 20B is a view illustrating distribution of average magnetic flux density in the cores and the coils according to FIG. 20A.

As aforementioned, the first coil 513 and the second coil 523 of the power reception unit 520 and the power transmission unit 510 are arranged to face each other during wireless charging. The first coil 513 and the second coil 523 are wound on the cores so as to be implemented into the cylindrical or polygonal solenoid shape.

In this instance, portions where the maximum magnetic flux density is exhibited are side portions of the cores illustrated in FIG. 20A. That is, the maximum magnetic density is exhibited at each of side ends of the magnetic concentration portions. The maximum magnetic flux density value or magnitude may depend on the shape of the core.

Here, a coupling coefficient between the simulated cores was 8.1.

Hereinafter, description will be given of variation embodiments of the magnetic flux concentration portions for enhancing wireless power transmission or reception efficiency with reference to the accompanying drawings.

Figure 21A:
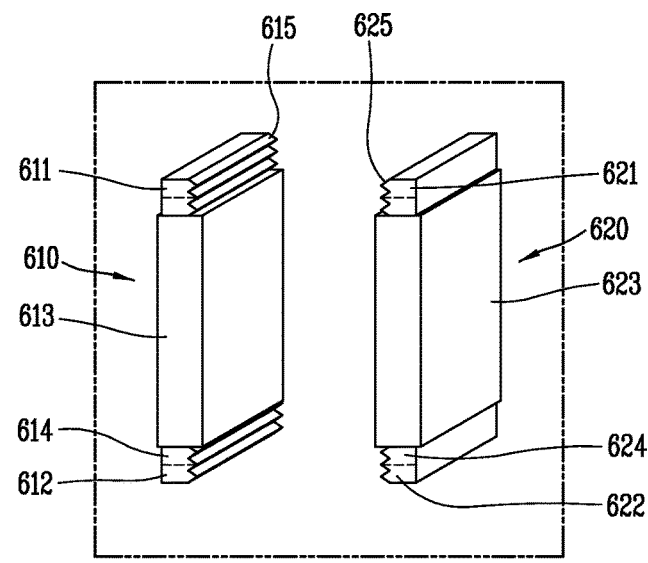
FIG. 21A is a conceptual view illustrating cores and coils in accordance with a first variation embodiment disclosed herein.
Figure 21B:
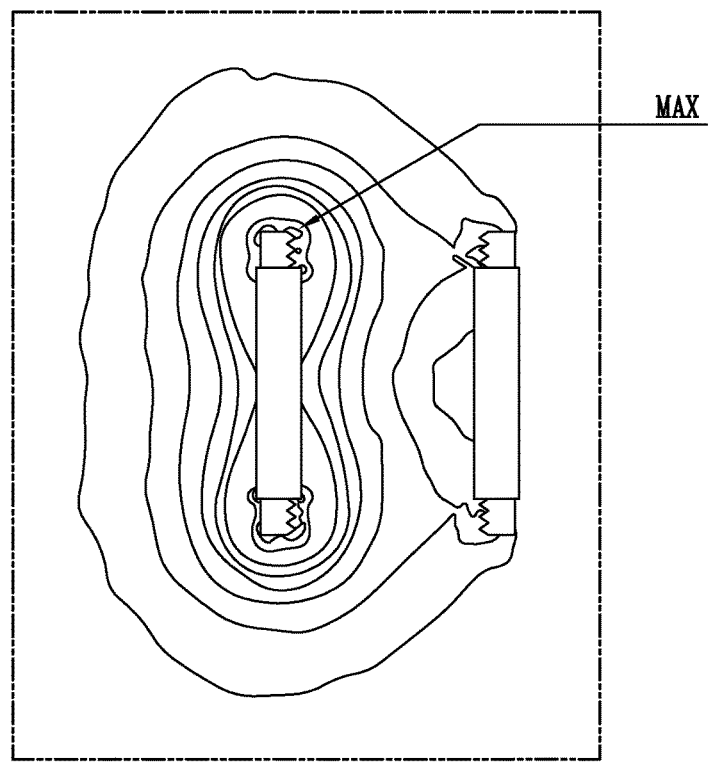
FIG. 21B is view illustrating distribution of average magnetic flux density in the cores and the coils according to FIG. 21A.

FIG. 21A is a conceptual view illustrating cores and coils in accordance with a first variation embodiment disclosed herein, and FIG. 21B is view illustrating distribution of average magnetic flux density in the cores and the coils according to FIG. 21A.

As illustrated in FIG. 21A, a first coil 613 and a second coil 623 of a power transmission unit 610 and a power reception unit 620 are disposed to face each other. Magnetic flux concentration portions 611, 612, 621 and 622 may be formed at both ends of cores wound with coils, respectively.

Protrusions 615 and 625 for increasing wireless power transmission or reception efficiency are formed on each of the magnetic flux concentration portions. A groove is formed between the protrusions. The protrusions may be formed at recessed portions on one surface of each magnetic flux concentration portion.

Alternatively, protrusions may protrude from one surface of one magnetic flux concentration portion toward another magnetic flux concentration portion which the one magnetic flux concentration portion faces. This may arouse improvement of a coupling coefficient between the cores. When the coupling coefficient between the cores of the embodiment illustrated in FIG. 21A was 8.1, a coupling coefficient between the cores according to the first variation embodiment was 8.2.

The improved coupling coefficient may result in enhancement of wireless charging efficiency. Referring to FIG. 21B, it can be noticed that an area of a portion with the maximum magnetic flux density of average magnetic flux density has increased as compared with that in FIG. 20B.

Figure 22A:
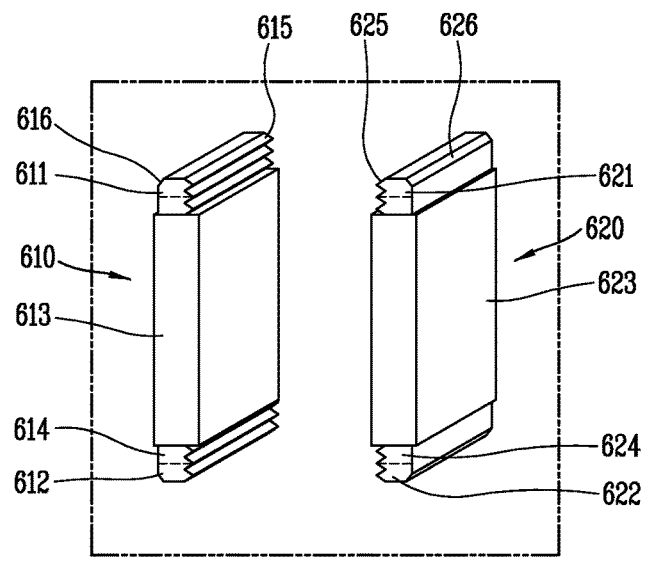
FIG. 22A is a conceptual view illustrating cores and coils in accordance with a second variation embodiment disclosed herein.
Figure 22B:
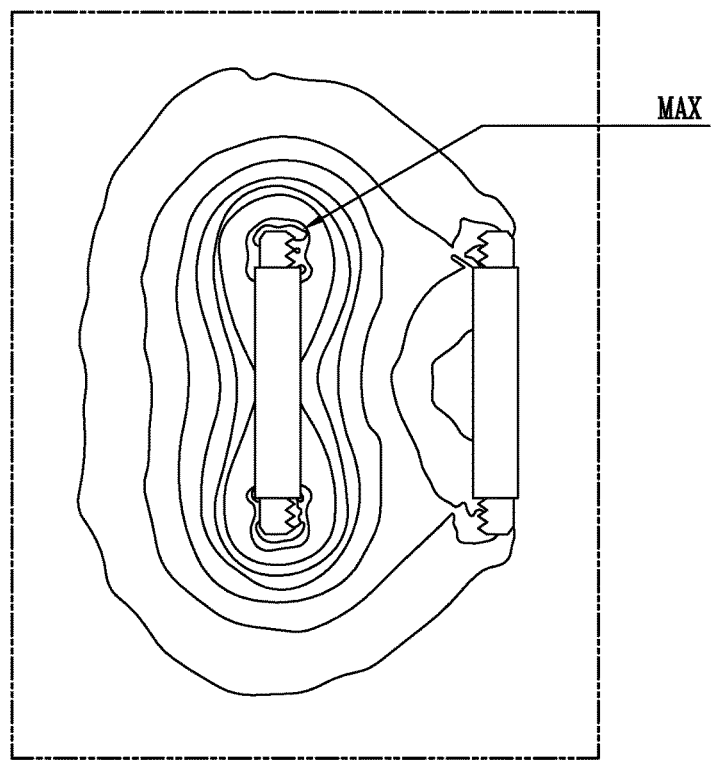
FIG. 22B is view illustrating distribution of average magnetic flux density in the cores and the coils according to FIG. 22A.

FIG. 22A is a conceptual view illustrating cores and coils in accordance with a second variation embodiment disclosed herein, and FIG. 22B is view illustrating distribution of average magnetic flux density in the cores and the coils according to FIG. 22A.

As illustrated in FIG. 22A, a first coil 613 and a second coil 623 of a power transmission unit 610 and a power reception unit 620 are disposed to face each other. Magnetic flux concentration portions may be formed at both ends of cores wound with coils, respectively.

Protrusions 615 and 625 for increasing wireless power transmission or reception efficiency are formed on each of the magnetic flux concentration portions. A groove is formed between the protrusions. The protrusions may be formed at recessed portions on one surface of each magnetic flux concentration portion. Alternatively, protrusions may protrude from one surface of one magnetic flux concentration portion toward another magnetic flux concentration portion which the one magnetic flux concentration portion faces.

Chamfers 616 and 626 may be formed by rounding edges of side ends of each core. The chamfers 616 and 626 are formed on another surface of each core, other than surface of the cores that face each other. This may allow for concentration of magnetic induction, thereby increasing the coupling coefficient between the cores. When the coupling coefficient between the cores of the embodiment illustrated in FIG. 22A was 8.1, a coupling coefficient between the cores according to the second variation embodiment was 8.3.

The improved coupling coefficient may result in enhancement of wireless charging efficiency. Referring to FIG. 22B, it can be noticed that an area of a portion with the maximum magnetic flux density of average magnetic flux density has increased as compared with that in FIG. 20B.

Figure 23A:
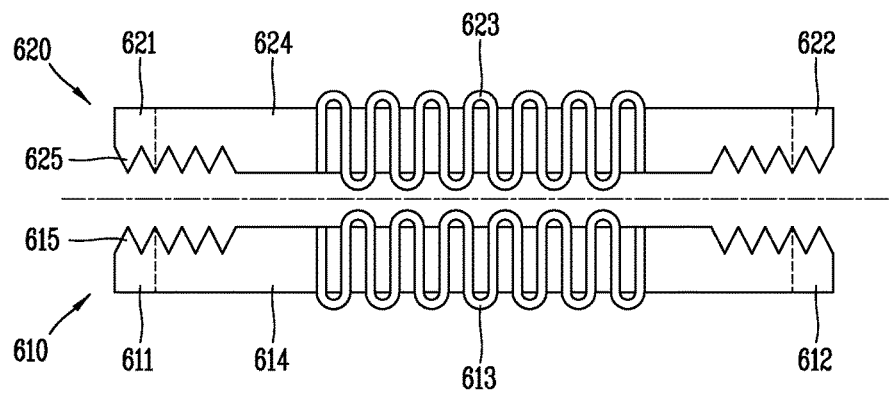
FIGS. 23A to 23C are conceptual views illustrating examples of a magnetic flux concentration unit for improving magnetic flux density.
Figure 23B:
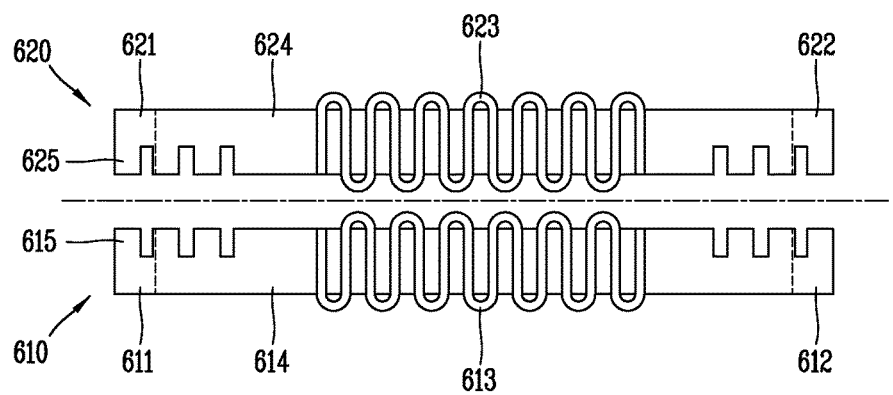
Figure 23C:
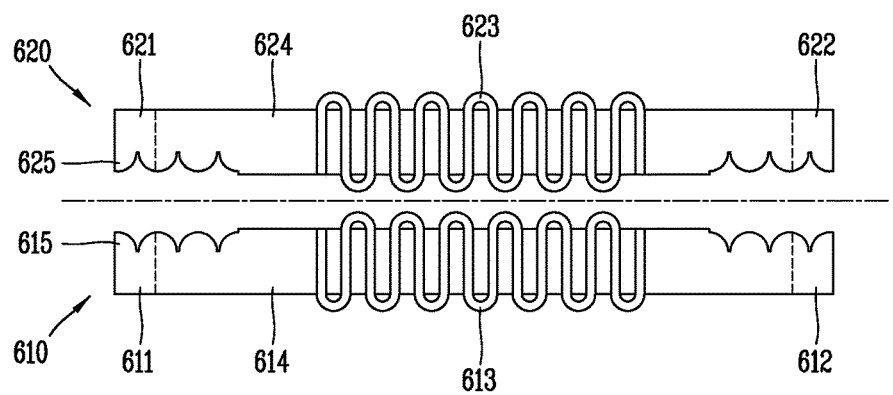

FIGS. 23A to 23C are conceptual views illustrating examples of magnetic flux concentration portions for improving magnetic flux density. Protrusions formed on magnetic flux concentration portions, as illustrated in FIGS. 23A to 23C, may be freely designed without a limitation of a shape.

Here, a groove is formed between the protrusions. The protrusions may be formed at recessed portions on one surfaces of each magnetic flux concentration portion. Alternatively, protrusions may protrude from one surface of one magnetic flux concentration portion toward another magnetic flux concentration portion which the one magnetic flux concentration portion faces.

Figure 24A:
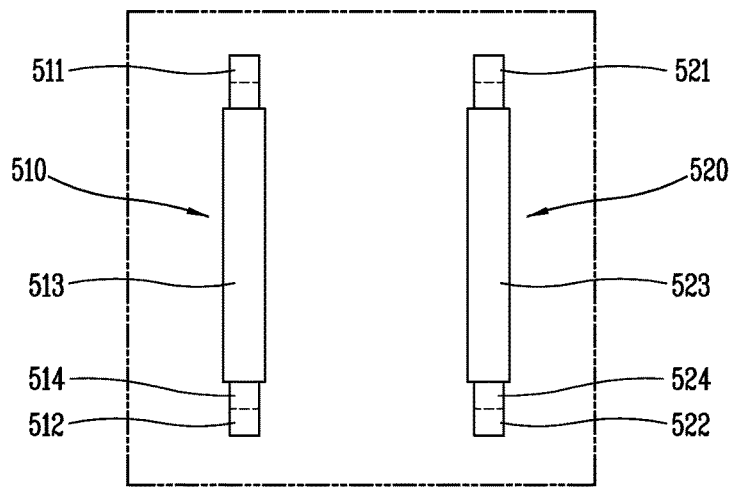
FIG. 24A is a conceptual view illustrating cores and coils in accordance with an embodiment disclosed herein.
Figure 24B:
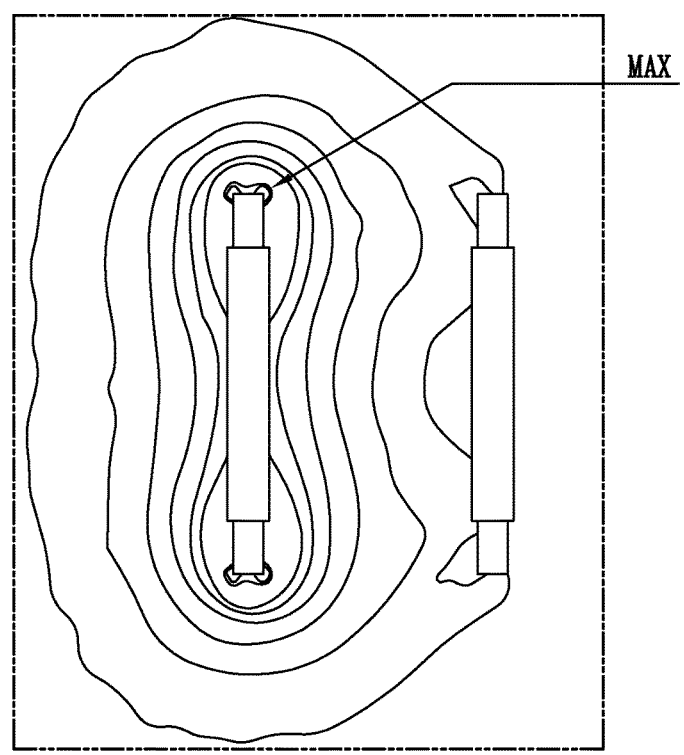
FIG. 24B is a view illustrating distribution of average magnetic flux density in the cores and the coils according to FIG. 24A.

FIG. 24A is a conceptual view illustrating cores and coils in accordance with an embodiment disclosed herein, and FIG. 24B is a view illustrating distribution of average magnetic flux density in the cores and the coils according to FIG. 24A.

As illustrated in FIG. 24A, a first coil 513 and a second coil 523 of a power transmission unit 510 and a power reception unit 520 during wireless charging are disposed to face each other. The first coil 513 and the second coil 523 are wound on cores so as to be implemented into a cylindrical or polygonal solenoid shape, respectively.

In this instance, portions with the maximum magnetic flux density are side edges of the cores illustrated in FIG. 24A. That is, the maximum magnetic flux density is exhibited at side ends of the magnetic flux concentration portions 511, 512, 521 and 522. The maximum magnetic flux density value or magnitude may depend on the shape of the core. Here, a coupling coefficient between the simulated cores was 10.1.

Figure 25A:
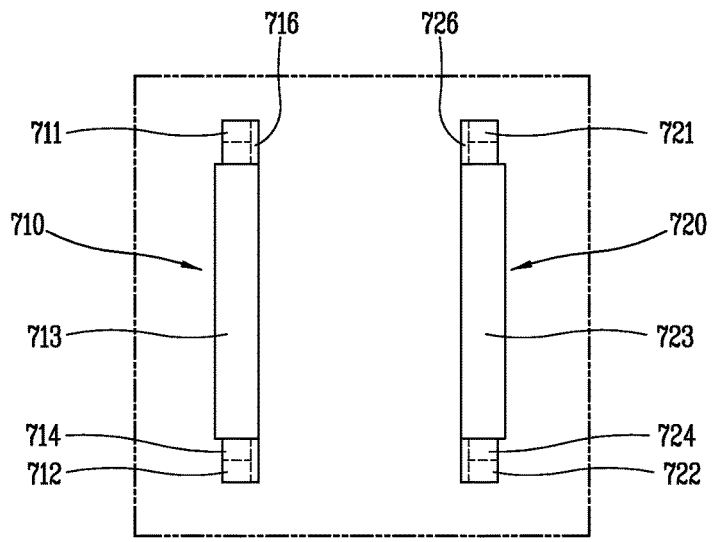
FIG. 25A is a conceptual view illustrating cores and coils in accordance with a third variation embodiment disclosed herein.
Figure 25B:
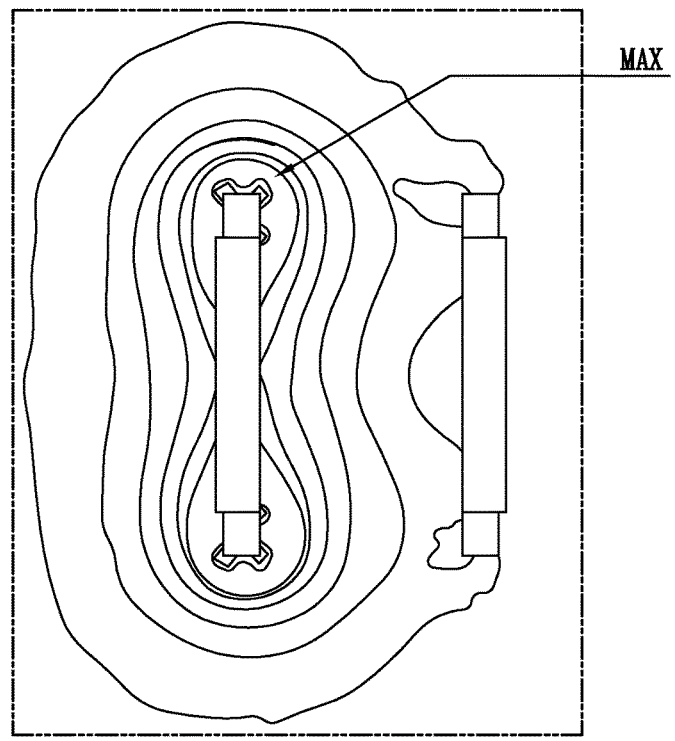
FIG. 25B is a view illustrating distribution of average magnetic flux density in the cores and the coils according to FIG. 25A.

FIG. 25A is a conceptual view illustrating cores and coils in accordance with a third variation embodiment disclosed herein, and FIG. 25B is a view illustrating distribution of average magnetic flux density in the cores and the coils according to FIG. 25A.

Referring to FIG. 25A, a first coil 713 and a second coil 723 of a power transmission unit 710 and a power reception unit 720 are disposed to face each other. Magnetic flux concentration portions 711, 712, 721 and 722 may be formed at both ends of cores wound with coils, respectively.

Reinforcing portions 716 and 726 may be formed at the magnetic flux concentration portions to increase wireless power transmission or reception efficiency. The reinforcing portions 716 and 726 may protrude from one surface of one magnetic flux concentration portion toward another magnetic flux concentration portion that the one magnetic flux concentration portion faces. This may result in an increase in a coupling coefficient between the cores. When the coupling coefficient between the cores of the embodiment illustrated in FIG. 24A was 10.1, a coupling coefficient between the cores according to the third variation embodiment was 10.2.

The improved coupling coefficient may result in enhancement of wireless charging efficiency. Referring to FIG. 25B, it can be noticed that an area of a portion with the maximum magnetic flux density of average magnetic flux density has increased as compared with that in FIG. 24B.

Figure 26A:
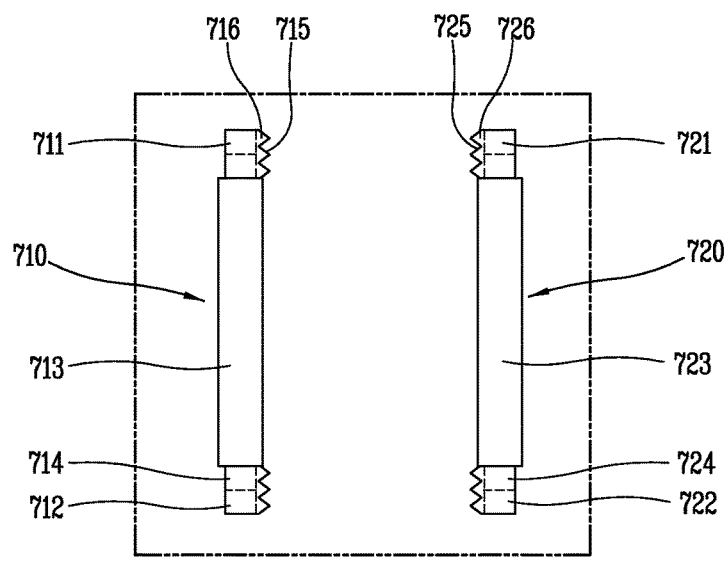
FIG. 26A is a conceptual view illustrating cores and coils in accordance with a fourth variation embodiment disclosed herein.
Figure 26B:
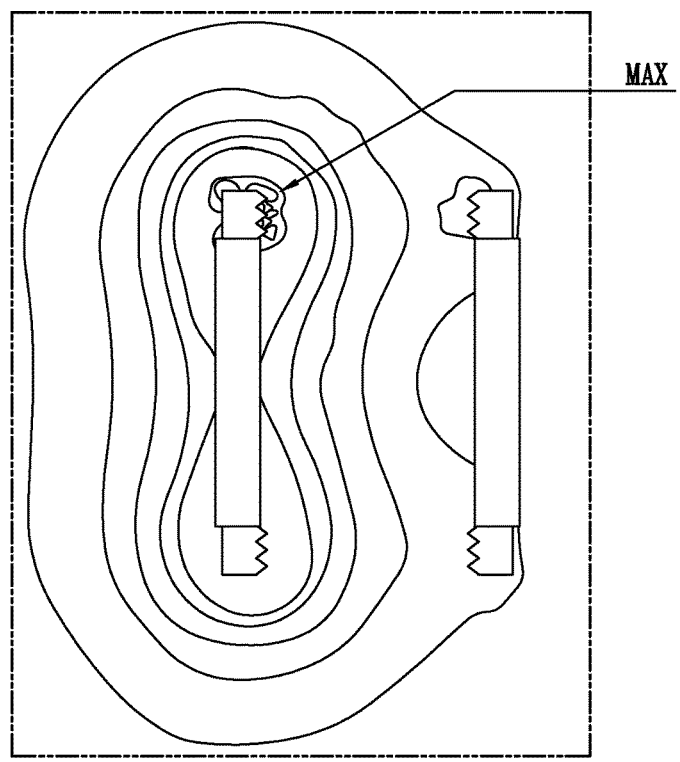
FIG. 26B is a view illustrating distribution of average magnetic flux density in the cores and the coils according to FIG. 26A.

FIG. 26A is a conceptual view illustrating cores and coils in accordance with a fourth variation embodiment disclosed herein, and FIG. 26B is a view illustrating distribution of average magnetic flux density in the cores and the coils according to FIG. 26A.

As illustrate din FIG. 26A, a first coil 713 and a second coil 723 of a power transmission unit 710 and a power reception unit 720 are disposed to face each other. Magnetic flux concentration portions 711, 712, 721 and 722 may be formed at both ends of cores wound with coils, respectively.

Reinforcing portions 716 and 726 may be formed at the magnetic flux concentration portions to increase wireless power transmission or reception efficiency. The reinforcing portions 716 and 726 may also protrude from one surface of one magnetic flux concentration portion toward another magnetic flux concentration portion that the one magnetic flux concentration portion faces.

Protrusions 715 and 725 which protrude from one surface of one reinforcing portion toward another reinforcing portion facing the one reinforcing portion may further be provided. This may result in an increase in a coupling coefficient between the cores. When the coupling coefficient between the cores of the embodiment illustrated in FIG. 24A was 10.1, a coupling coefficient between the cores according to the fourth variation embodiment was 10.3.

The improved coupling coefficient may result in enhancement of wireless charging efficiency. Referring to FIG. 26B, it can be noticed that an area of a portion with the maximum magnetic flux density of average magnetic flux density has increased as compared with that in FIG. 24B. The increase in the area refers to an increase in the maximum value of the maximum magnetic flux density.

The foregoing methods may be implemented within a recording medium which is readable by a computer or a similar device using software, hardware or a combination thereof.

For a hardware implementation, the embodiments described herein may be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electric units designed to perform the functions described herein. For example, the foregoing methods may be implemented by the control unit 180 or power transmission control unit 112 in the wireless power transmitter 100.

For a software implementation, the embodiments such as procedures and functions disclosed herein may be implemented with separate software modules. Each of the software modules may perform one or more of the functions and operations described herein. Software codes may be implemented by using a software application written in a suitable programming language. The software codes may be stored in the memory 150 in the wireless power transmitter 100, and implemented by the control unit 180 or the power transmission control unit 112.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The invention claimed is:

1. An electronic device configured to wirelessly receive electric power from a wireless power transfer device,
    wherein a power reception unit of the electronic device comprises:
    a core having a predetermined length and having magnetic flux concentration portions formed at lengthwise side portions thereof; and
    a coil wound along an outer periphery of the core to form magnetic flux density in the magnetic flux concentration portions, the magnetic flux density having a magnitude equal to or larger than a predetermined value,
    wherein points of the core with a maximum magnetic flux density are lengthwise side ends of the core,
    wherein the magnetic flux concentration portions comprises at least one protrusion and a chamfer,
    wherein the at least one protrusion is formed on one surface of the magnetic flux concentration portions, the one surface facing the wireless power transfer device, and
    wherein the chamfer is formed on the other surface of the magnetic flux concentration portions and formed by rounding an edge of side ends of the core such that a magnetic flux is concentrated at the magnetic flux concentration portions.

2. The electronic device of claim 1, wherein the core comprises a first magnetic flux concentration portion formed at a first side portion thereof, and a second magnetic flux concentration portion formed at a second side portion facing the first side portion, and
    wherein the coil is uniformly wound along the core between the first magnetic flux concentration portion and the second magnetic flux concentration portion.

3. The electronic device of claim 1, wherein the core comprises ferrite.

4. The electronic device of claim 1, wherein the at least one protrusion has at least one shape among a triangular shape, a rectangular shape, a semicircular shape and a combination thereof.

5. The electronic device of claim 1, wherein the at least one protrusion is formed at a recessed portion on the one surface of the magnetic flux concentration portion.

6. The electronic device of claim 1, wherein the at least one protrusion protrudes toward the wireless power transfer device.

7. The electronic device of claim 1, wherein a power transmission unit of the wireless power transfer device comprises a core and a coil which are symmetric to the core and the coil of the power reception unit.

8. An electric vehicle configured to wirelessly receive electric power from a wireless power transfer device,
    wherein a power reception unit of the electric vehicle comprises:
    a core having a predetermined length and having magnetic flux concentration portions formed at lengthwise side portions thereof; and
    a coil wound along an outer periphery of the core to form magnetic flux density in the magnetic flux concentration portions, the magnetic flux density having a magnitude equal to or larger than a predetermined value,
    wherein points of the core with a maximum magnetic flux density are lengthwise side ends of the core,
    wherein the magnetic flux concentration portions comprises at least one protrusion and a chamfer,
    wherein the at least one protrusion is formed on one surface of the magnetic flux concentration portions, the one surface facing the wireless power transfer device, and
    wherein the chamfer is formed on the other surface of the magnetic flux concentration portions and formed by rounding an edge of side ends of the core such that a magnetic flux is concentrated at the magnetic flux concentration portions.

9. A wireless power transfer device configured to wirelessly transmit power to an electric vehicle or an electronic device,
    wherein a power transmission unit of the wireless power transfer device comprises:
    a core having a predetermined length and having magnetic flux concentration portions formed at lengthwise side portions thereof; and
    a coil wound along an outer periphery of the core to form magnetic flux density in the magnetic flux concentration portions, the magnetic flux density having a magnitude equal to or larger than a predetermined value,
    wherein points of the core with a maximum magnetic flux density are lengthwise side ends of the core,
    wherein the magnetic flux concentration portions comprises at least one protrusion and a chamfer,
    wherein the at least one protrusion is formed on one surface of the magnetic flux concentration portions, the one surface facing the wireless power transfer device, and
    wherein the chamfer is formed on the other surface of the magnetic flux concentration portions and formed by rounding an edge of side ends of the core such that a magnetic flux is concentrated at the magnetic flux concentration portions.

10. The wireless power transfer device of claim 9, wherein the core comprises a first magnetic flux concentration portion formed at a first side portion thereof, and a second magnetic flux concentration portion formed at a second side portion facing the first side portion, and
    wherein the coil is uniformly wound along the core between the first magnetic flux concentration portion and the second magnetic flux concentration portion.

11. The wireless power transfer device of claim 9, wherein the core comprises ferrite.

12. The wireless power transfer device of claim 9, wherein the at least one protrusion has at least one shape among a triangular shape, a rectangular shape, a semicircular shape and a combination thereof.

13. The wireless power transfer device of claim 9, wherein the at least one protrusion is formed at a recessed portion on the one surface of each magnetic flux concentration portion.

14. The wireless power transfer device of claim 9, wherein the at least one protrusion protrudes toward the electric vehicle or the electronic device.

15. The wireless power transfer device of claim 9, wherein a power reception unit of the electric vehicle or the electronic device comprises a core and a coil which are symmetric to the core and the coil of the power transmission unit.

16. The wireless power transfer device of claim 15, further comprising stoppers configured to restrict a movement of the electric vehicle or the electronic device when the power reception unit is arranged to face the power transmission unit.

* * * * *